US012643213B2

(12) United States Patent
Kaye, Jr. et al.

(10) Patent No.: US 12,643,213 B2
(45) Date of Patent: Jun. 2, 2026

(54) POWER TOOL ACCESSORIES FOR CUTTING TUBULAR MEMBERS

(71) Applicant: BLACK & DECKER INC., New Britain, CT (US)

(72) Inventors: Thomas R. Kaye, Jr., Fallston, MD (US); Melissa Wyrwas, Severn, MD (US)

(73) Assignee: Black & Decker Inc., New Britain, CT (US)

( * ) Notice: Subject to any disclaimer, the term of this patent is extended or adjusted under 35 U.S.C. 154(b) by 537 days.

(21) Appl. No.: 17/451,008

(22) Filed: Oct. 15, 2021

(65) Prior Publication Data

US 2022/0134526 A1 May 5, 2022

Related U.S. Application Data

(60) Provisional application No. 63/176,618, filed on Apr. 19, 2021, provisional application No. 63/107,985, filed on Oct. 30, 2020.

(51) Int. Cl.
B25F 3/00 (2006.01)
B23D 21/08 (2006.01)
(Continued)

(52) U.S. Cl.
CPC ............... B25F 3/00 (2013.01); B23D 21/08 (2013.01); B23D 35/002 (2013.01); B25F 5/001 (2013.01)

(58) Field of Classification Search
CPC ...... B23D 35/002; B23D 21/08; B23D 29/00; B23D 21/04; B23D 21/06; B23D 21/00; B25F 3/00; B25F 5/001; B26D 3/16
(Continued)

(56) References Cited

U.S. PATENT DOCUMENTS 1,749,861 A 3/1930 Vosper
2,586,209 A 2/1952 Giacomo
(Continued)

FOREIGN PATENT DOCUMENTS

CN 208787874 U 4/2019
CN 210648756 U 6/2020
(Continued)

OTHER PUBLICATIONS

Extended European Search Report, EP Application No. 21205036.3, Mar. 21, 2022, 11 pages, EPO.
(Continued)

*Primary Examiner* — Ghassem Alie
*Assistant Examiner* — Robert D Cornett
(74) *Attorney, Agent, or Firm* — Brake Hughes Bellermann LLP

(57) ABSTRACT

A power tool accessory for cutting tubular members includes a housing, an input shaft configured to be coupled to a rotary power tool, a transmission, and a cutting head removably received in a front end of the housing. The transmission includes an input gear and an output gear with a first plurality of teeth. The cutting head has a central opening, a cutting blade protruding into the central opening, and a second plurality of teeth engaged by the first plurality of teeth. A clamp assembly coupled to the housing is moveable between a first position where the cutting head is removable from the housing and a second position where the cutting head is retained in the housing. The cutting head receives a tubular member in the central opening with the cutting blade engaging the tubular member to cut the tubular member as the cutting head rotates about the tubular member.

23 Claims, 29 Drawing Sheets

(51) Int. Cl.
    *B23D 35/00*     (2006.01)
    *B25F 5/00*     (2006.01)

(58) Field of Classification Search
    USPC .......... 30/95, 102, 92, 93; 83/469, 471, 478,
    83/603, 582
    See application file for complete search history.

(56)           References Cited

U.S. PATENT DOCUMENTS

| | | | |
|---|---|---|---|
| 2,782,500 A | 2/1957 | Kelley | |
| 2,787,054 A | 4/1957 | Franck | |
| 2,940,093 A | 6/1960 | Pealer | |
| 3,535,960 A | 10/1970 | Borries | |
| 3,951,564 A | 4/1976 | Montgomery | |
| 4,157,615 A | 6/1979 | Courty | |
| 4,177,557 A | 12/1979 | Courty | |
| 4,411,178 A | 10/1983 | Wachs et al. | |
| 4,438,562 A | 3/1984 | Courty | |
| 4,690,211 A | 9/1987 | Kuwahara et al. | |
| 4,769,911 A | 9/1988 | Araki | |
| 4,794,775 A | 1/1989 | Kuwahara et al. | |
| 4,802,278 A | 2/1989 | Vanderpol et al. | |
| 4,890,385 A * | 1/1990 | VanderPol | B23D 21/04 |
| | | | 30/94 |
| D312,953 S | 12/1990 | Vanderpol et al. | |
| 5,088,196 A | 2/1992 | Fukuda | |
| 5,203,238 A | 4/1993 | Ferguson | |
| 5,475,924 A | 12/1995 | Mcdaniel | |
| 5,813,299 A | 9/1998 | Soucy | |
| 5,836,079 A | 11/1998 | Cronin et al. | |
| 5,943,778 A | 8/1999 | Alana | |
| 6,065,212 A | 5/2000 | Lazarevic | |
| 6,481,105 B1 | 11/2002 | Haung | |
| 6,637,115 B2 | 10/2003 | Walsh et al. | |
| 6,658,739 B1 | 12/2003 | Huang | |
| 6,666,062 B2 | 12/2003 | Dole et al. | |
| 6,732,842 B2 | 5/2004 | Nemoto | |
| 7,013,567 B2 | 3/2006 | Myers | |
| 7,013,778 B1 | 3/2006 | Lupke et al. | |
| 7,293,362 B2 | 11/2007 | Konen | |
| 7,320,268 B2 | 1/2008 | Kawashima | |
| 7,406,769 B1 | 8/2008 | Toussaint | |
| 7,743,510 B2 | 6/2010 | Lazarevic | |
| 7,845,080 B2 | 12/2010 | Nasiell | |
| 7,984,556 B2 | 7/2011 | Konen | |
| 8,261,454 B2 | 9/2012 | Wilson, Jr. | |
| 8,266,991 B2 | 9/2012 | Thorson et al. | |
| 8,689,449 B2 | 4/2014 | Lazarevic | |
| 8,763,257 B2 | 7/2014 | Thorson et al. | |
| 8,800,151 B2 | 8/2014 | Lee | |
| 9,231,386 B2 | 1/2016 | Kochi et al. | |
| 9,302,402 B2 | 4/2016 | Thorson et al. | |
| 9,381,625 B2 | 7/2016 | Chen et al. | |
| 9,505,067 B1 | 11/2016 | Nasiell et al. | |
| 9,539,682 B2 * | 1/2017 | Kawakami | B24B 23/04 |
| 9,566,652 B2 | 2/2017 | Nasiell | |
| 9,821,386 B2 | 11/2017 | Soto | |
| 10,046,470 B2 | 8/2018 | Troy et al. | |
| 10,059,018 B2 | 8/2018 | Zhou et al. | |
| 10,259,132 B2 | 4/2019 | Liao et al. | |
| 10,625,435 B2 | 4/2020 | Wang | |
| 10,919,098 B2 | 2/2021 | Hyma et al. | |
| 2005/0086809 A1 * | 4/2005 | Myers | B23D 21/08 |
| | | | 81/182 |
| 2005/0150113 A1 | 7/2005 | Shultis | |
| 2006/0032351 A1 | 2/2006 | Scinta et al. | |
| 2006/0037198 A1 | 2/2006 | Sullivan | |
| 2006/0260133 A1 | 11/2006 | Goop | |
| 2007/0180701 A1 | 8/2007 | Hutt | |
| 2011/0179649 A1 * | 7/2011 | Park | B23D 21/04 |
| | | | 30/95 |
| 2012/0103142 A1 | 5/2012 | Sroka | |
| 2012/0204699 A1 * | 8/2012 | Soltesz | A01G 3/053 |
| | | | 83/697 |
| 2016/0008895 A1 | 1/2016 | Chen | |
| 2016/0214265 A1 | 7/2016 | Thorson et al. | |
| 2018/0297227 A1 | 10/2018 | Jenkins | |
| 2019/0275691 A1 * | 9/2019 | Wang | B23D 21/04 |

FOREIGN PATENT DOCUMENTS

| | | | |
|---|---|---|---|
| CN | 215199885 U | 12/2021 | |
| CN | 115958236 A | 4/2023 | |
| DE | 3939816 A1 | 6/1991 | |
| DE | 202004011189 U1 | 9/2004 | |
| DE | 102007056567 A1 | 5/2009 | |
| DE | 202013008257 U1 | 1/2014 | |
| DE | 212016000124 U1 | 1/2018 | |
| DE | 202020103844 U1 | 10/2020 | |
| EP | 0121131 B1 | 10/1987 | |
| EP | 0165583 B1 | 6/1989 | |
| EP | 3991896 A1 | 5/2022 | |
| JP | S58165903 A | 10/1983 | |
| JP | H07266122 A | 10/1995 | |
| JP | 3066633 B2 | 7/2000 | |

OTHER PUBLICATIONS

Extended European Search Report, EP Application No. 24174212.1, Oct. 11, 2024, 9 pages, EPO.

* cited by examiner

POWER TOOL ACCESSORIES FOR CUTTING TUBULAR MEMBERS

RELATED APPLICATONS

This application claims priority, under 35 U.S.C. § 119(e), to U.S. Provisional Application No. 63/176,618, filed Apr. 19, 2021, titled "Power Tool Accessories for Cutting Tubular Members," and to U.S. Provisional Patent Application No. 63/107,985, filed Oct. 30, 2020, titled "Power Tool Accessories for Cutting Tubular Members," each of which is incorporated by reference.

TECHNICAL FIELD

This application relates to accessories usable with rotary power tools, such as drills and impact drivers, for cutting tubular members, such as copper or metal pipes.

BACKGROUND

Hand operated tools and power operated tools can be used to cut tubes, such as pipes.

SUMMARY

In an aspect, a power tool accessory for cutting tubular members includes a housing and an input shaft received in a rear end portion of the housing. The input shaft is configured to be coupled to a rotary power tool to be driven in rotation by the power tool. A puck shaped cutting head (also referred to herein as a puck) carrying at least one cutting wheel or blade is configured to be received in a front end portion of the housing. The input shaft is drivingly coupled to the cutting head by a transmission configured to convert rotary motion of the input shaft to ratcheting motion of the cutting head. In operation, a tubular member is receivable in the cutting head and engageable by the cutting wheel or blade so that the cutting wheel or blade cuts the tubular member as the cutting head ratchetly rotates about the tubular member in response to rotary input motion of the input shaft from a power tool.

Implementations of this aspect may include one or more of the following features. The transmission may include an eccentric member coupled to a front end of the input shaft and a wobble plate engaged by the eccentric member and moveable in a rocking motion. The wobble plate may have driving teeth engaged with driven teeth on a ratchet wheel received in a front end of the housing. The ratchet wheel may have ratchet pawls or teeth that engage ratchet teeth on the cutting head. When the input shaft rotates, the eccentric causes the wobble plate to wobble or oscillate, which causes the ratchet wheel to oscillate, which causes the ratchet wheel to oscillate, which causes the cutting head to rotate in a ratcheting manner in one direction to cut the tubular member. The cutting head may be removable from the housing to be used by hand. The housing may include a cam lock mechanism for opening a cover on the housing to change or remove the cutting head. The interior of the cutting head carries a pair of rollers and a cutting wheel or blade with a spring biasing the cutting wheel or blade toward an interior of the cutting head.

In another aspect, a power tool accessory for cutting tubular members includes a housing and an input shaft received in a rear end portion of the housing. The input shaft is configured to be coupled to a rotary power tool to be driven in rotation by the power tool. A puck shaped cutting head (also referred to herein as a puck) carrying at least one cutting wheel or blade is configured to be received in a front end portion of the housing. The cutting head comprises a C-shaped body and a pivoting door that can pivot open to receive a tubular member in the central opening of the body and that can pivot closed to form a closed annular body with the C-shaped body. The input shaft drives the cutting head in rotation via a transmission. In operation, a tubular member is receivable in the cutting head and engageable by the cutting wheel or blade so that the cutting wheel or blade cuts the tubular member as the cutting head rotates about the tubular member in response to rotary input motion of the input shaft from a power tool.

Implementations of this aspect may include one or more of the following features. The transmission includes an input right angle gear, which drives an intermediate right angle gear. The intermediate right angle gear may be mounted on a common shaft with an output gear. The body also has a plurality of gear teeth on its outer periphery. The cutting head is receivable in the front of the base so that the teeth on the cutting head mesh with the teeth on the output gear. Thus, rotation of the input shaft causes rotation of the cutting head about its center axis. The cutting head is held in place in the body by a clamping mechanism that includes a latch, a pair of springs, and a plate that carries one or more pins. When the latch is closed, pins on the plate are pressed into an annular groove in the cutting head and ride in the groove so that the cutting head stays in the base. The interior of the cutting head carries a pair of rollers and a cutting wheel or blade with a spring biasing the cutting wheel or blade toward an interior of the cutting head.

In another aspect, a power tool accessory for cutting tubular members includes a housing having a base and an input shaft received in a rear end portion of the base. The input shaft is configured to be coupled to a rotary power tool to be driven in rotation by the power tool. The housing also includes a retractable sheath received over the base and biased by a spring away from the input shaft. A removable cutting wheel or blade is received in the base and is drivingly coupled to the input shaft via a transmission to rotate when the input shaft rotates. In use, the input shaft is coupled to a rotary power tool and then the sheath is pressed against a tubular member and retracts, while the cutting wheel or blade rotates to cut the tubular member.

The input shaft is coupled to a transmission that includes pair of right angle gears. The output right angle gear is mounted on a common shaft with a large gear, which meshes with a small output gear. The output gear is coupled to an output shaft to which a removable cutting wheel or blade is mounted, e.g., in a manner similar to a circular saw or an angle grinder. The transmission is configured to increase rotational speed from the input shaft to the cutting wheel or blade. The cutting wheel or blade may comprise an abrasive wheel, such as an abrasive cutting wheel or blade used with angle grinders. The sheath may include a recess in its front end to better retain the pipe.

Implementations of this aspect may include one or more of the following features. The transmission may include a pair of right angle gears coupled to the input shaft. The output right angle gear may be mounted on a common shaft with a large gear, which meshes with a small output gear. The small output gear may be coupled to an output shaft to which the wheel may be mounted. The sheath may include a recess in its front end to better retain the pipe.

In another aspect, a power tool accessory for cutting tubular members includes a housing and an input shaft received in a rear end portion of the housing. The input shaft is configured to be coupled to a rotary power tool to be driven in rotation by the power tool. A transmission is received in the housing and includes at least two idler gears. A C-shaped and puck-shaped cutting head (also referred to herein as a puck) includes has a central opening, a plurality of teeth about its periphery, and at least one cutting wheel or blade facing inward toward the central opening. The cutting head is configured to be removably receivable in a front end portion of the housing with its plurality of teeth configured to mesh with teeth on the idler gears when the cutting head is received in the housing. When the input shaft rotates, the transmission causes the cutting head to rotate about its central axis with the teeth of the cutting head remaining in mesh with at least one of the idler gears during each full rotation of the cutting head. In operation, a tubular member is receivable in the central opening in the cutting head and engageable by the cutting wheel or blade so that when the cutting head rotates, the cutting wheel or blade cuts the tubular member.

Implementations of this aspect may include one or more of the following features. The transmission may include an input right angle gear coupled to the input shaft and output right angle gear meshed with the input right angle gear to change an axis of rotation by 90 degrees. The transmission may further include one or more speed reduction gears disposed between the output right angle gear and the at least two idler gears. The speed reduction gears may include a first spur gear on a common drive shaft with the output right angle gear and a second spur gear meshed with the first spur gear and the idler gears. The cutting head may be removably held in place in the housing by a clamping mechanism. The clamping mechanism may include a cover moveable relative to a base of the housing and a lever (e.g., a cam lever) configured to move the cover between a closed position in which the cutting head is retained in the housing and an open position in which the cutting head is removable from the housing. The clamping mechanism may further include at least one spring biasing the cover toward the open position. The cover may carry at least one pin so that, when in the closed position, the pin engages a semi-annular groove or track in the cutting head and rides in the track so that the cutting head remains in the housing while it rotates. The C-shaped opening may be defined by an interior wall of the cutting head, which may carry at least one roller and the cutting wheel or blade with a spring biasing the cutting wheel or blade toward the central opening.

Advantages may include one or more of the following. The power tool accessory may facilitate quick and easy cutting of tubular members such as pipes, using an existing rotary power tool. In addition, the cutting device or cutting head may be removably coupled to the housing of the power tool accessory and may be used by itself as a hand tool or may be coupled to and usable with a separate manual hand tool. These and other advantages and features will be apparent from the description and the drawings.

BRIEF DESCRIPTION OF THE DRAWINGS

FIG. 18A is a side view, partially in phantom, of the power tool accessory of FIGS. 17A-17B.

DETAILED DESCRIPTION

Figure 1A:
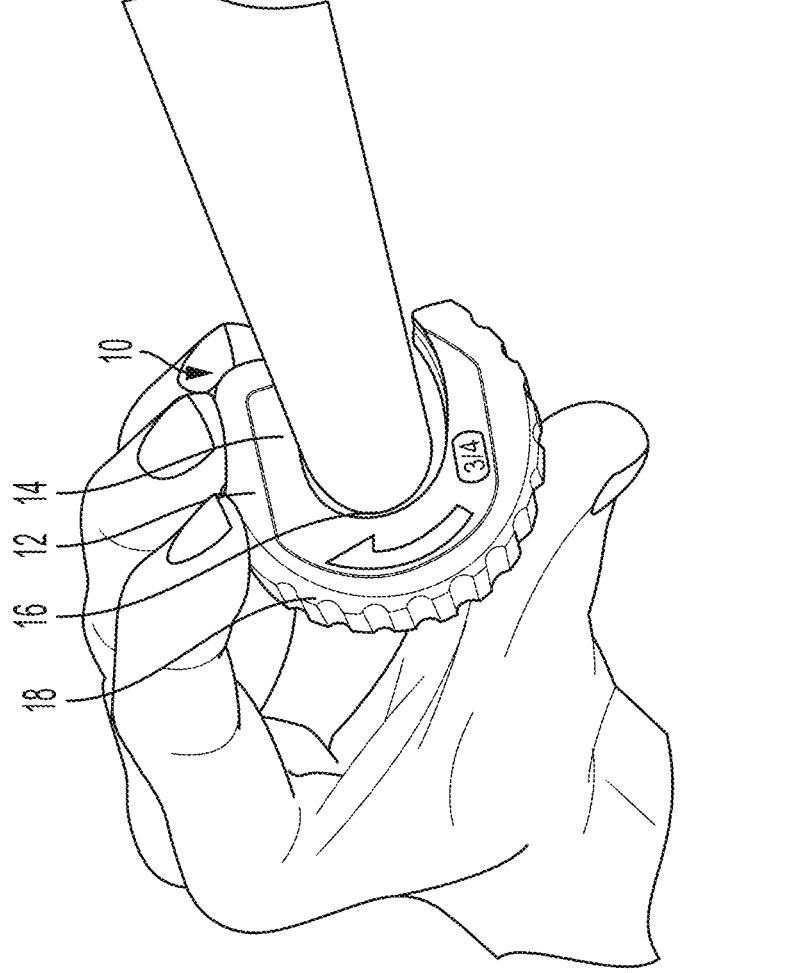
FIG. 1A is a perspective view of a manual hand tool for cutting a tubular member in the form of a puck-shaped cutting head.
Figure 1B:
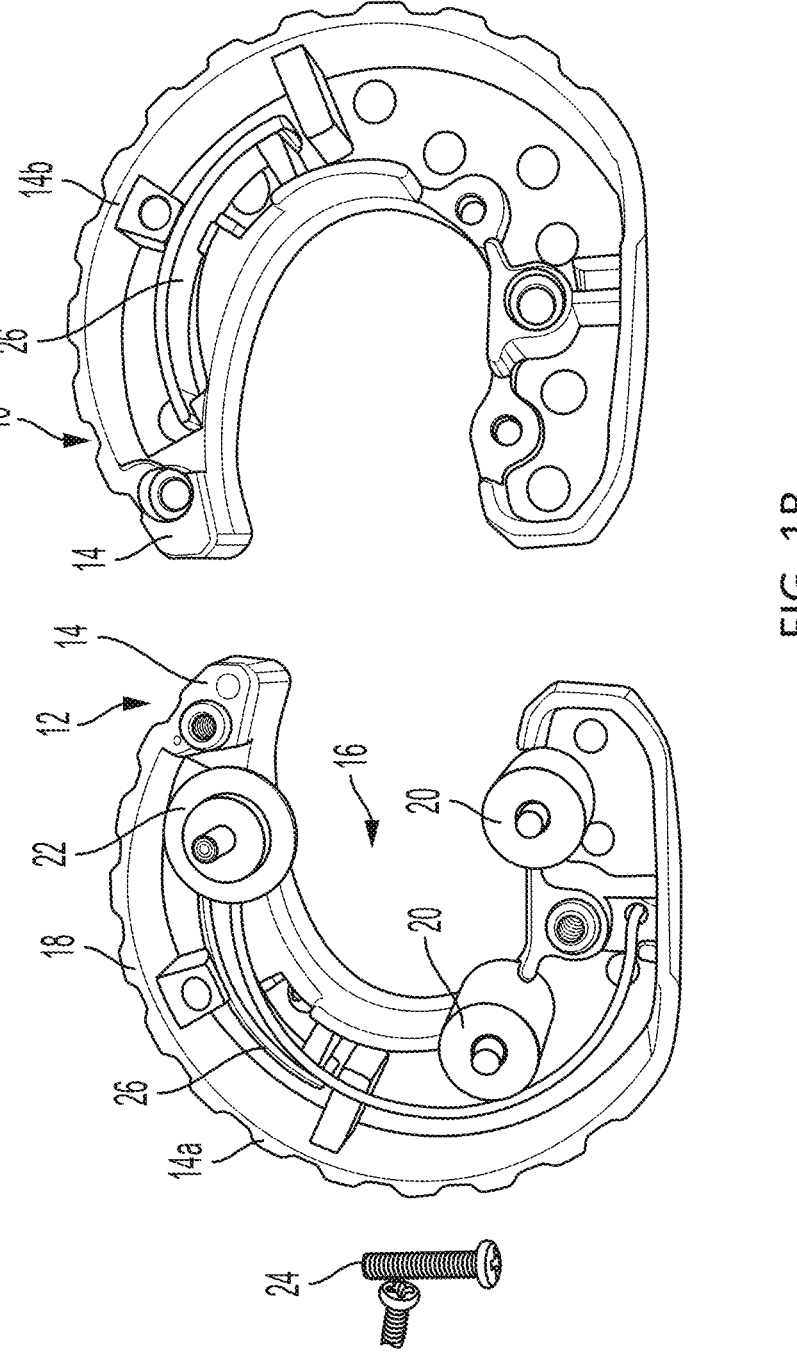
FIG. 1B is a top view of the cutting device of FIG. 1A with its casing halves separated.
Figure 1D:
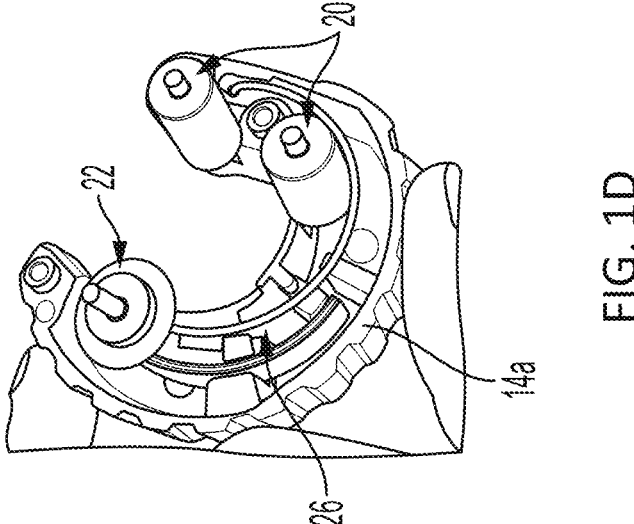
FIGS. 1C and 1D are perspective views of one of the casing halves of the cutting device of FIGS. 1A-1B.
Figure 1C:
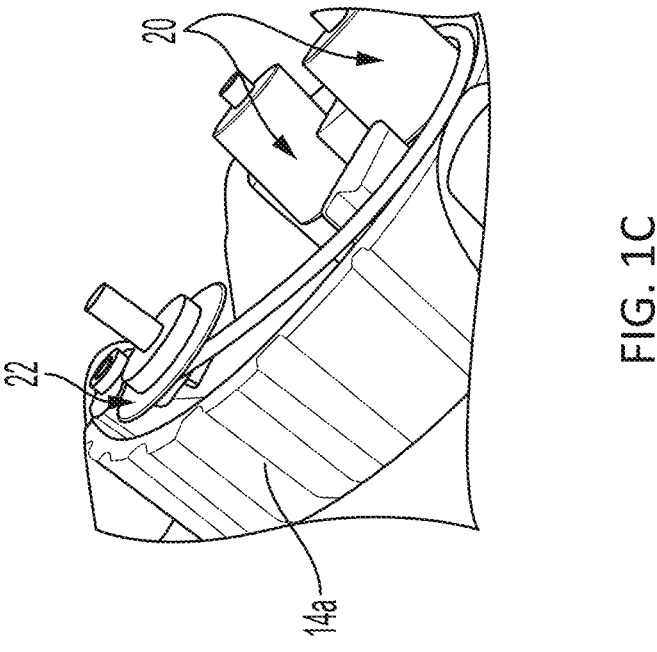

Referring to FIGS. 1A-1D, in an embodiment, a manually operated hand tool 10 (e.g., similar to a LENOX 14831T534 hand tool) may be used for cutting tubular members, such as pipes. The hand tool 10 comprises a puck-shaped cutting head or puck 12 with a C-shaped casing 14 having a central opening 16 and a plurality of gripping surfaces 18 on its periphery. The casing has two casing halves 14a, 14b joined together by threaded fasteners 24. The casing 14 carries at least one roller 20 (e.g., a pair of rollers 20) and at least one cutting wheel or blade 22 that each at least partially extend radially inward into the central opening 16. The cutting wheel or blade 22 and/or the rollers 20 are biased radially inward toward a center of the casing by two leaf springs 26. A tubular member or pipe 28 can be received in the central opening between the rollers and cutting wheel or blade. As the cutting head 12 is rotated by hand about its central axis X, the cutting wheel or blade cuts the tubular member or pipe 28 that is received in the central opening.

Figures 1E, 1F:
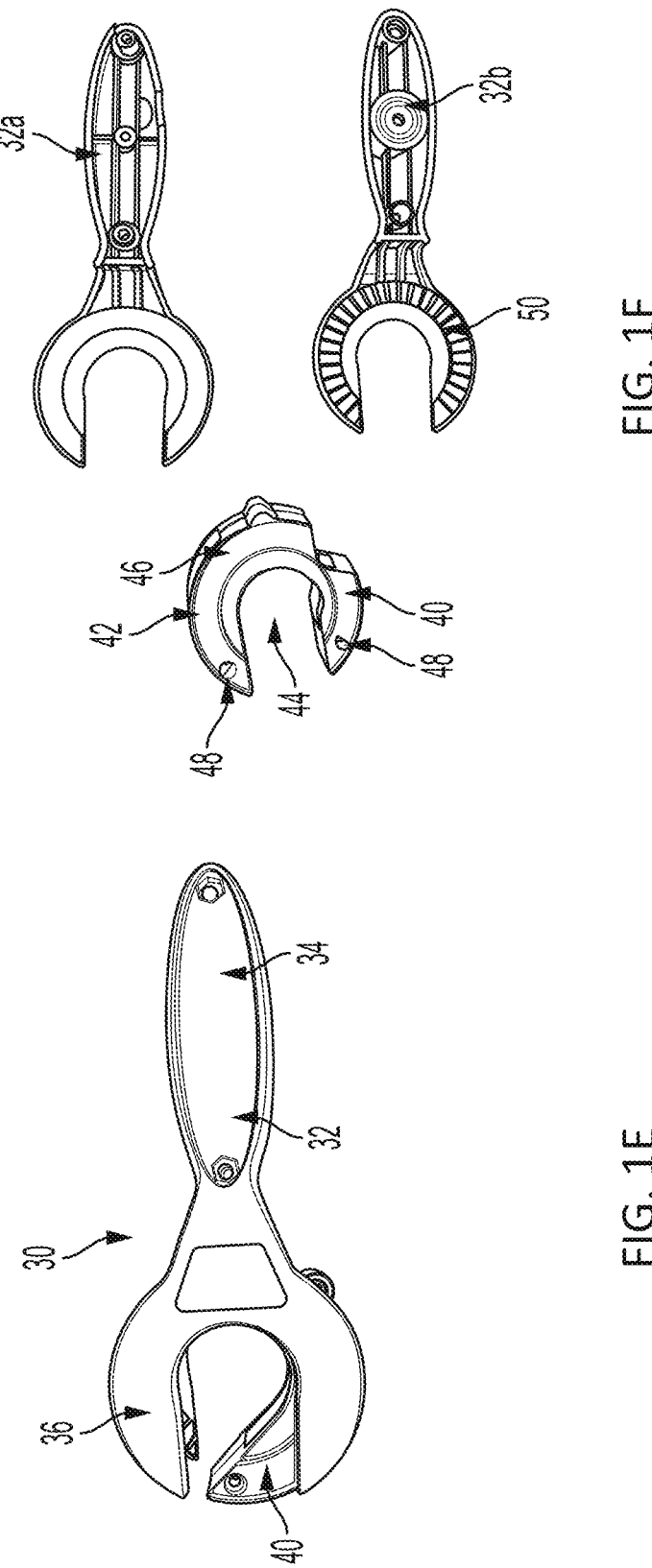
FIG. 1E is a top view of another embodiment of a manual hand tool for cutting a tubular member.
FIG. 1F is a top view of the hand tool of FIG. 1E with its housing halves separated.
Figure 2:
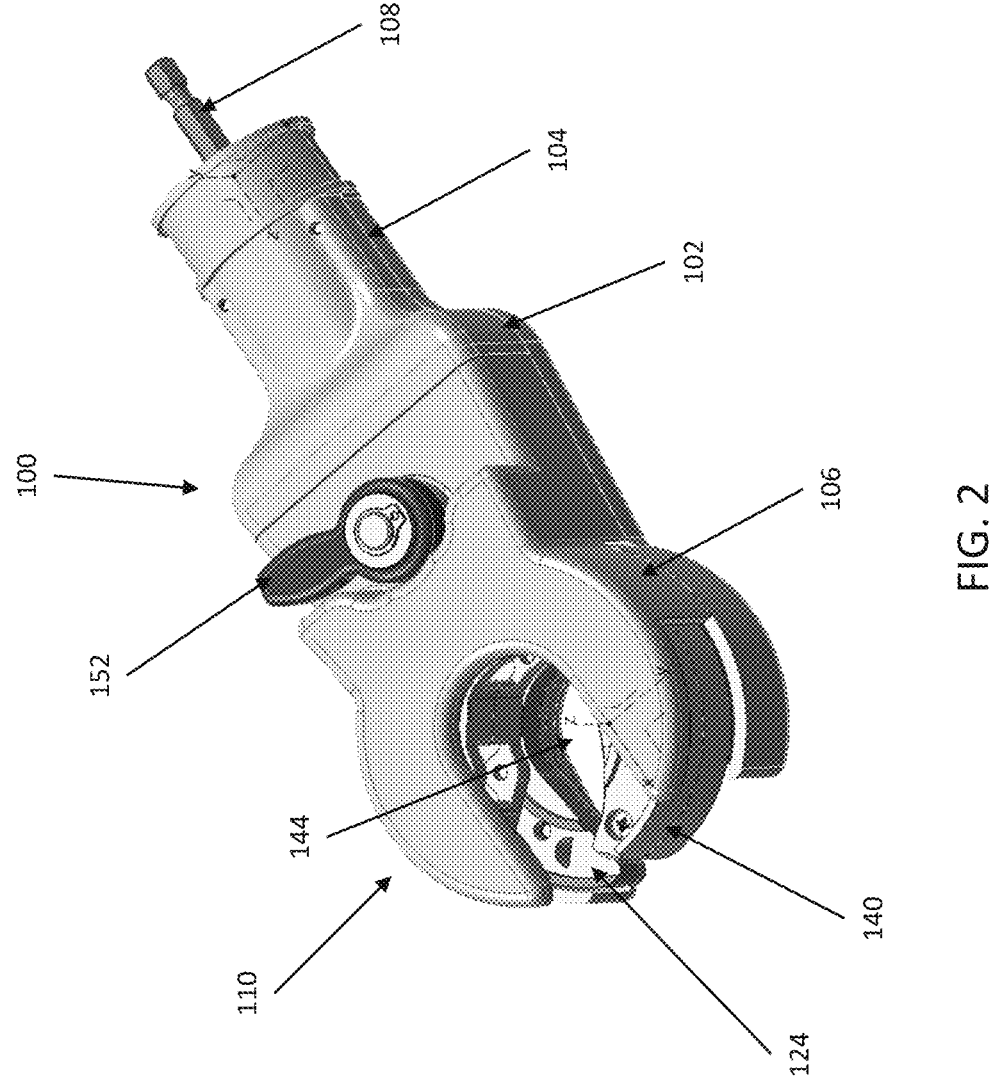
FIGS. 2-7 are perspective views of an embodiment of a power tool accessory for cutting a tubular member.
Figures 3A, 3B:
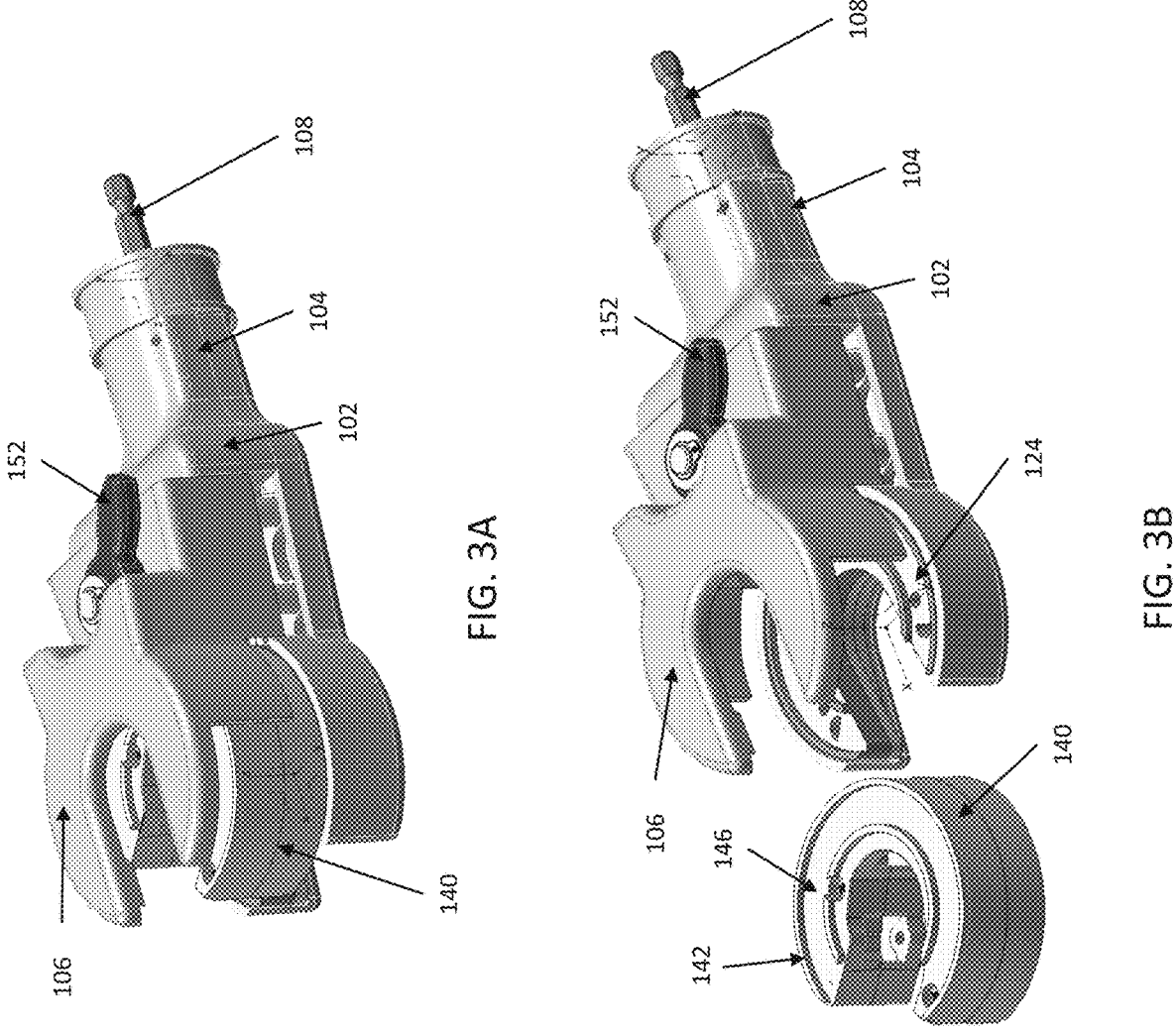

Referring to FIGS. 1E-1F, in another embodiment, a manual operated hand tool 30 (e.g., similar to an Irwin IRHT81736 pipe cutter) may be used to cut tubular members, such as a pipes. The hand tool 30 includes a housing 32 with a handle 34 and a working head 36 that receives a C-shaped cutting head or puck 40. The housing 32 includes a bottom housing portion 32a and a top housing portion 32b with the puck 40 sandwiched between the housing portions. The C-shaped cutting head 40 is similar to the C-shaped cutting head 12 described above, with the following differences. Like the cutting head 12, the cutting head 40 has a C-shaped casing 42 with a central opening 44 and at least one roller and at least one cutting wheel or blade that each at least partially extend radially inward into the central opening 44 and are biased in a radially inward direction by leaf springs. A tubular member or pipe to be cut can be received in the central opening with the rollers and cutting blade engaging the tubular member. Unlike the cutting head 12, the C-shaped casing 42 of the cutting head 40 has a circumferential track or groove 46 with at least one (e.g., two) spring biased ratchet pawls 48. The bottom housing portion 32*b* has ratcheting teeth 50 that engage spring biased ratchet pawls 48 on the cutting head so that when the handle is rotated back and forth about the central opening, the cutting head moves in a ratcheting manner in one direction and the blade cuts the pipe.

Referring to FIG. 2-8B, in another embodiment, a power tool accessory 100 for cutting tubular members, such as pipes, includes a housing 102 having a handle 104 and a movable cover 106. The housing 102 has a U-shaped working head portion 110 that removably receives a C-shaped cutting head 140 having a similar configuration as the C-shaped cutting head 40 described above with respect to FIGS. 1E-1F, with the following differences. Like the cutting head 40, the cutting head 140 has a C-shaped casing 142 with a central opening 144 and at least one roller and at least one cutting wheel or blade (not shown) that each at least partially extend radially inward into the central opening 144 and are biased in a radially inward direction by leaf springs. The C-shaped casing 142 also has a circumferential track 146 on a top surface. Unlike the cutting head 40, the cutting head 140 has a plurality of one-way ratchet teeth 148 on an opposite bottom surface. Alternatively, the ratchet teeth may be formed integrally on an outer periphery of the cutting head.

The housing 102 receives an input shaft 108 that can be coupled to and driven in rotation by a drill, impact driver, or other rotary power tool. The input shaft 108 is supported by two bearings 112 in the handle 104 and is drivingly coupled to the cutting head via a ratcheting transmission 114. The ratcheting transmission 114 includes an eccentric member 116 at one end of the input shaft 108 received in a recess of a wobble plate 118. At its front end the wobble plate 118 has several driving gear teeth 120 that engage several driven gear teeth 122 on a ratchet wheel 124. The ratchet wheel 124 has two half-moon shaped ratchet driving pawls 126 that engage the one-way ratchet teeth 148 on the bottom surface of the cutting head 140. The ratchet wheel 124 has a track 128 in which the ratchet teeth 148 on the cutting head ride. The cover 106 includes a top track 130 that receives the track 146 on the top surface of the cutting head 140 to prevent the cutting head from moving laterally when it rotates about its axis.

In use, a tubular member to be cut is received in the central opening 144 and the input shaft 108 is coupled to an output of a rotary power tool. When the input shaft is rotated by the rotary power tool, the eccentric wobbles causing the wobble plate to oscillate. The driving teeth on the wobble plate engage the driven teeth on the ratchet wheel, causing the ratchet wheel to oscillate. The ratchet pawls on the ratchet wheel engage the one-way ratchet teeth on the cutting head to cause the cutting head to rotate in one direction in a ratcheting manner to cut a tubular member. In an alternative embodiment, the ratchet pawls may be disposed on the casing of the cutting head (similar to the cutting head 40 described above) and the ratchet teeth may be disposed on the ratchet wheel.

Figures 4A, 4B:
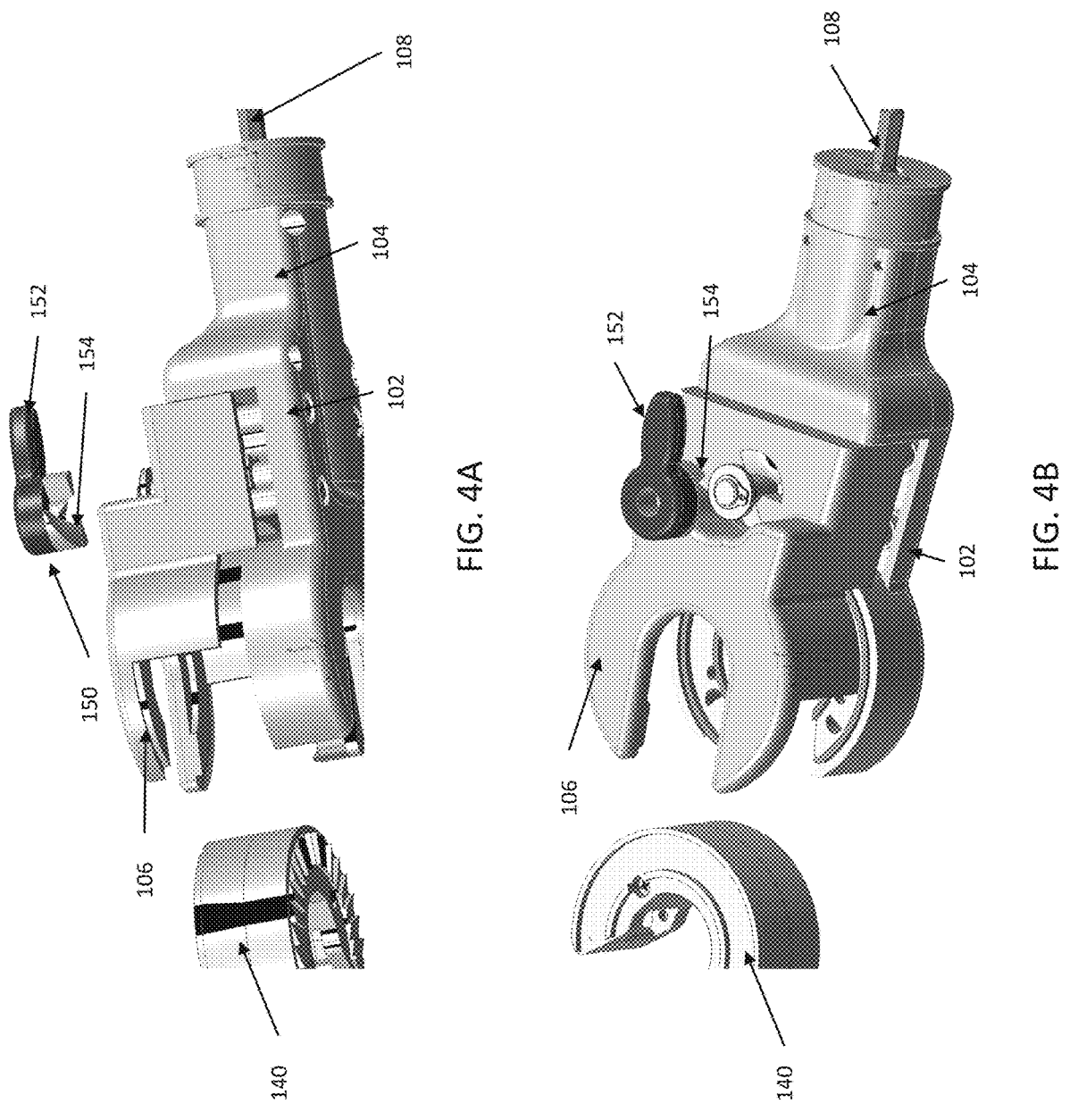
Figure 5:
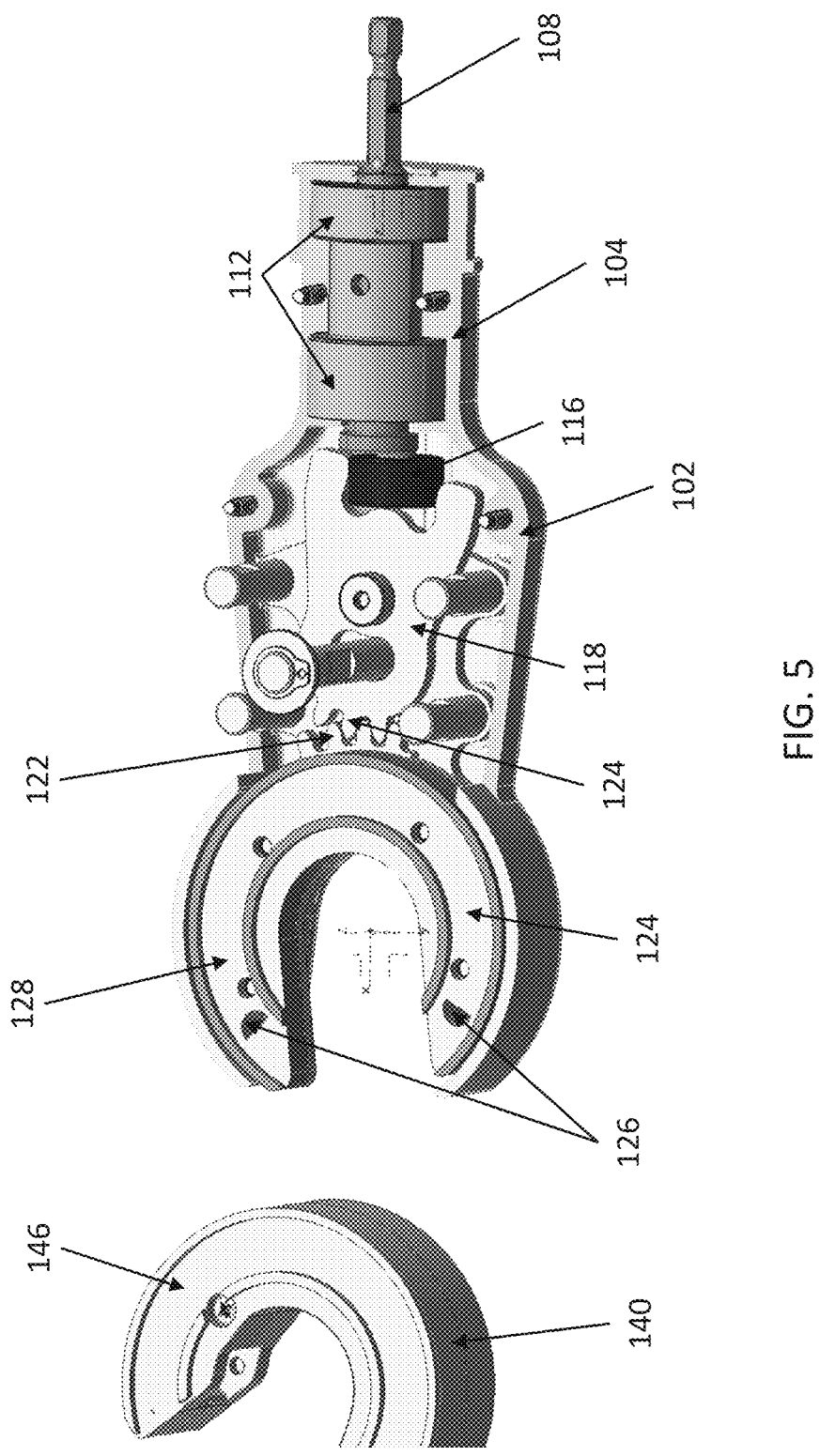
Figure 6:
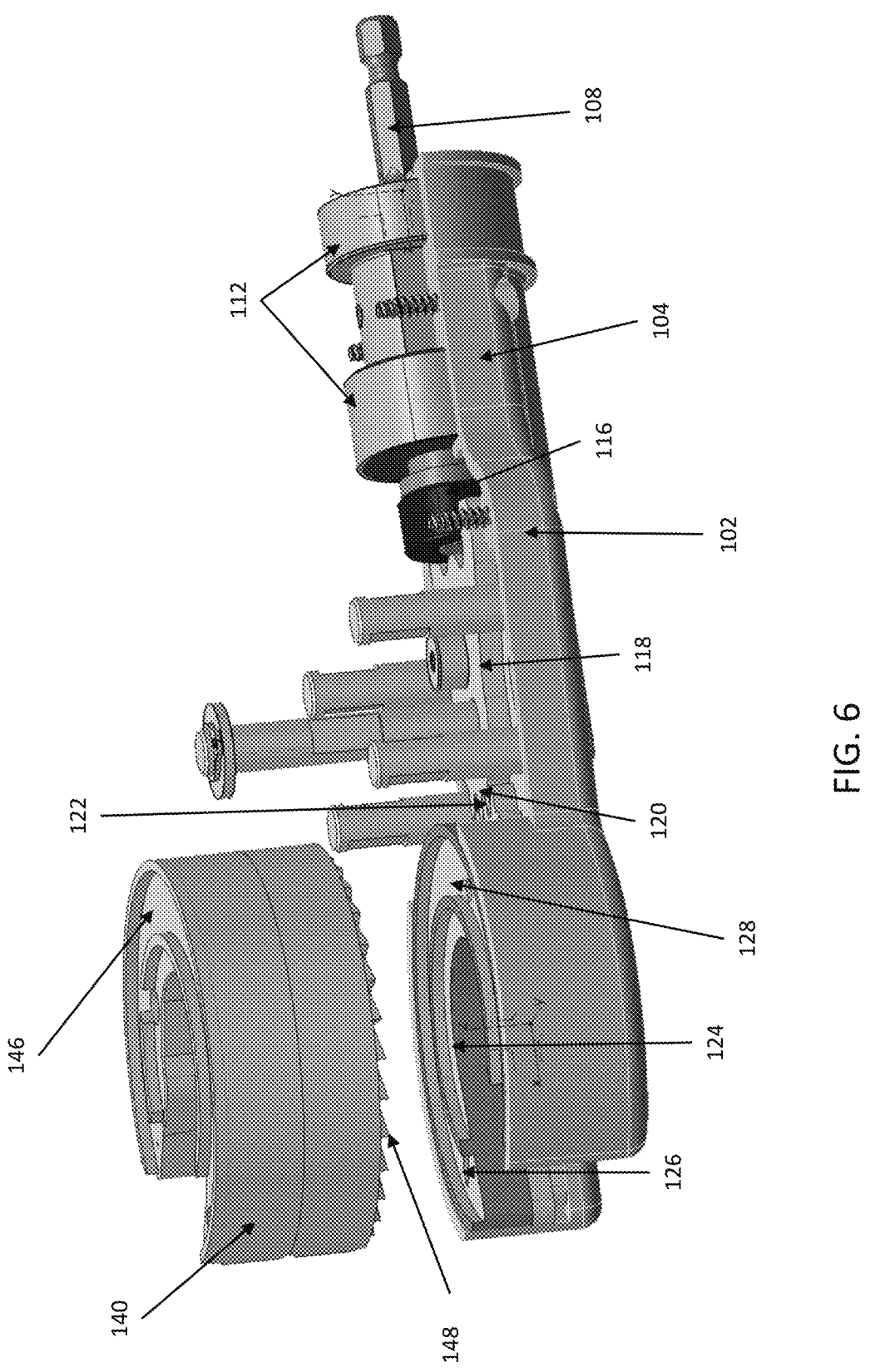
Figure 7:
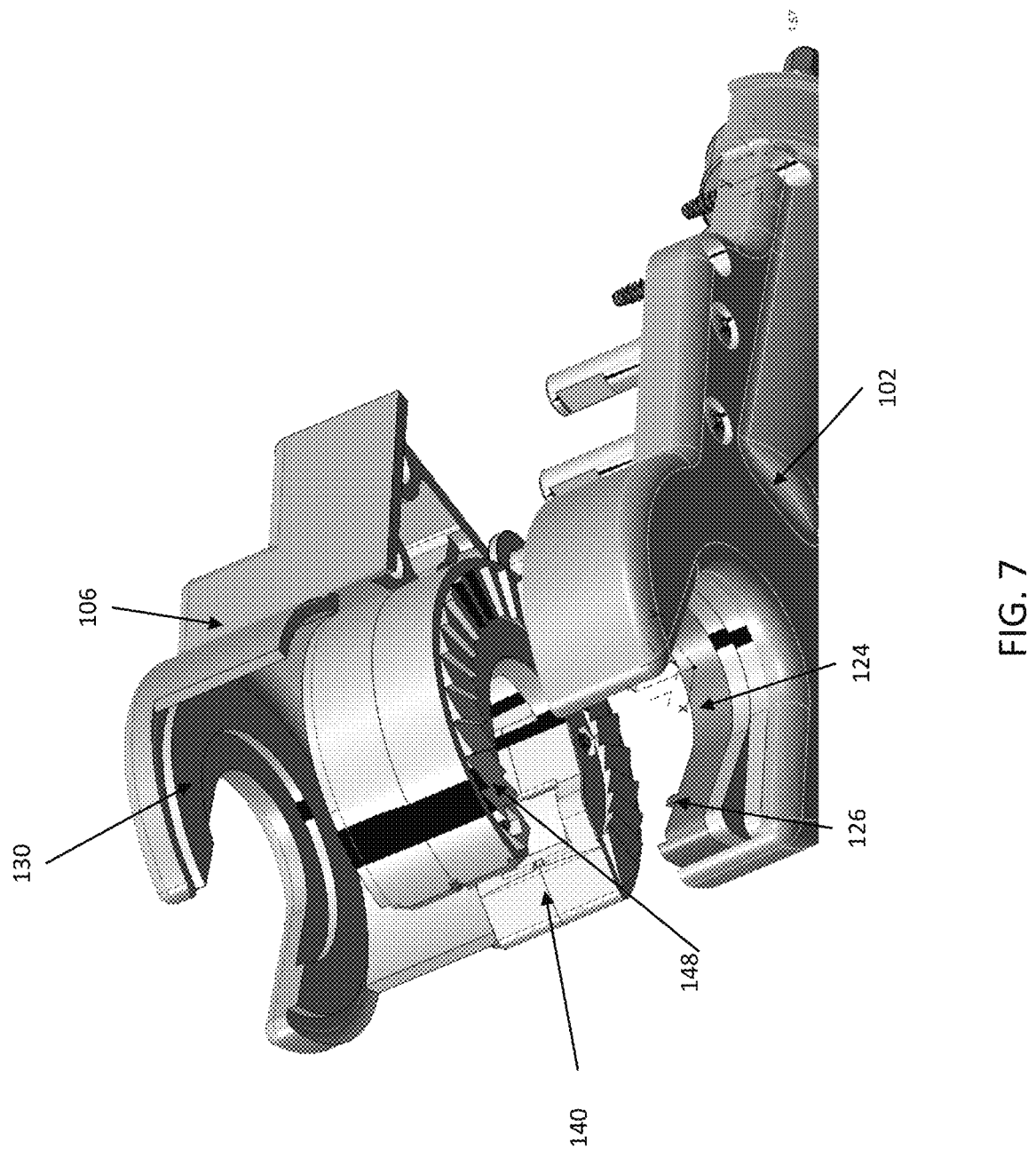
Figures 8A, 8B:
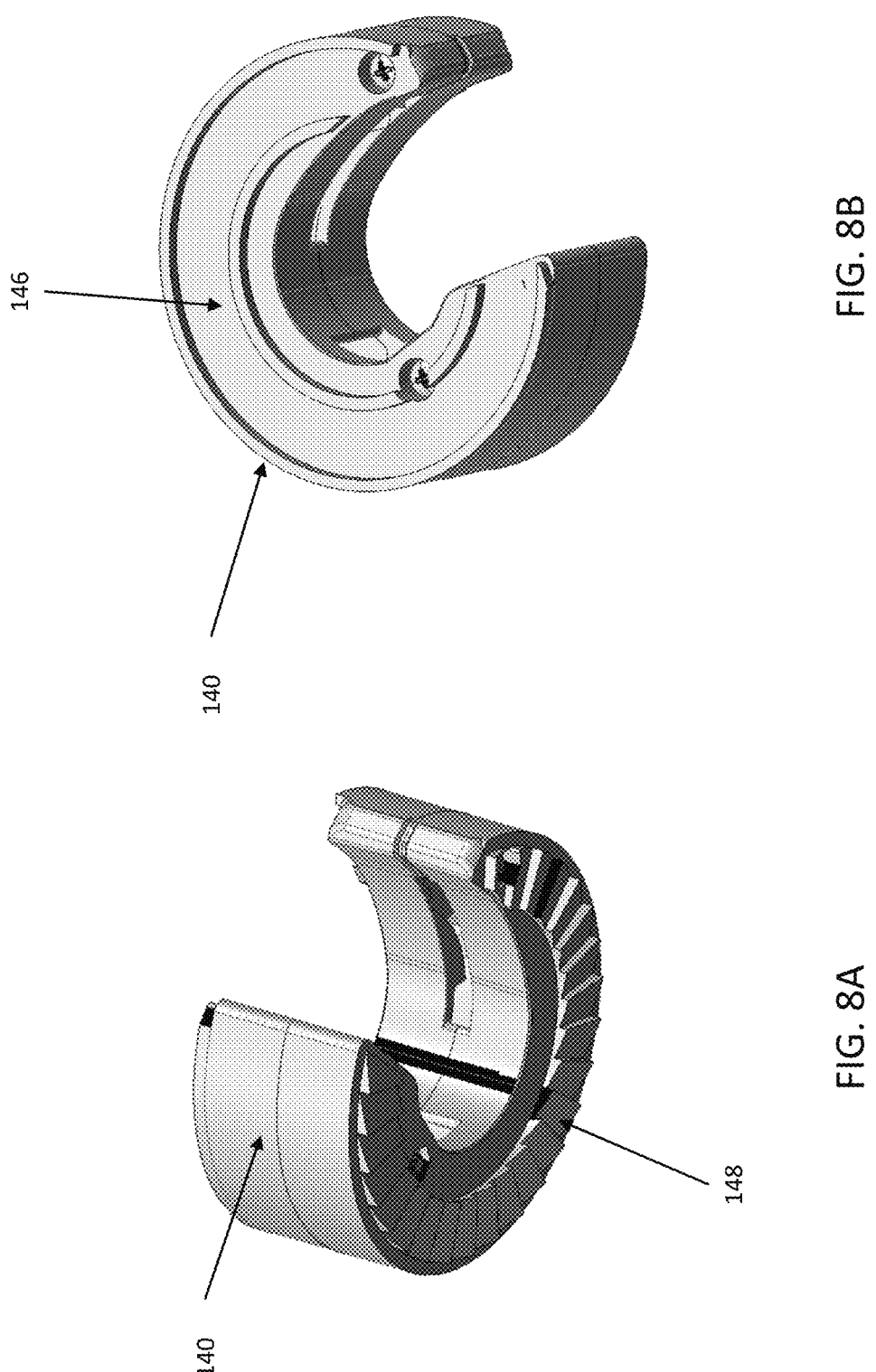
FIGS. 8A-8B are perspective views of a cutting head for use with the power tool accessory of FIGS. 2-7.
Figure 9:
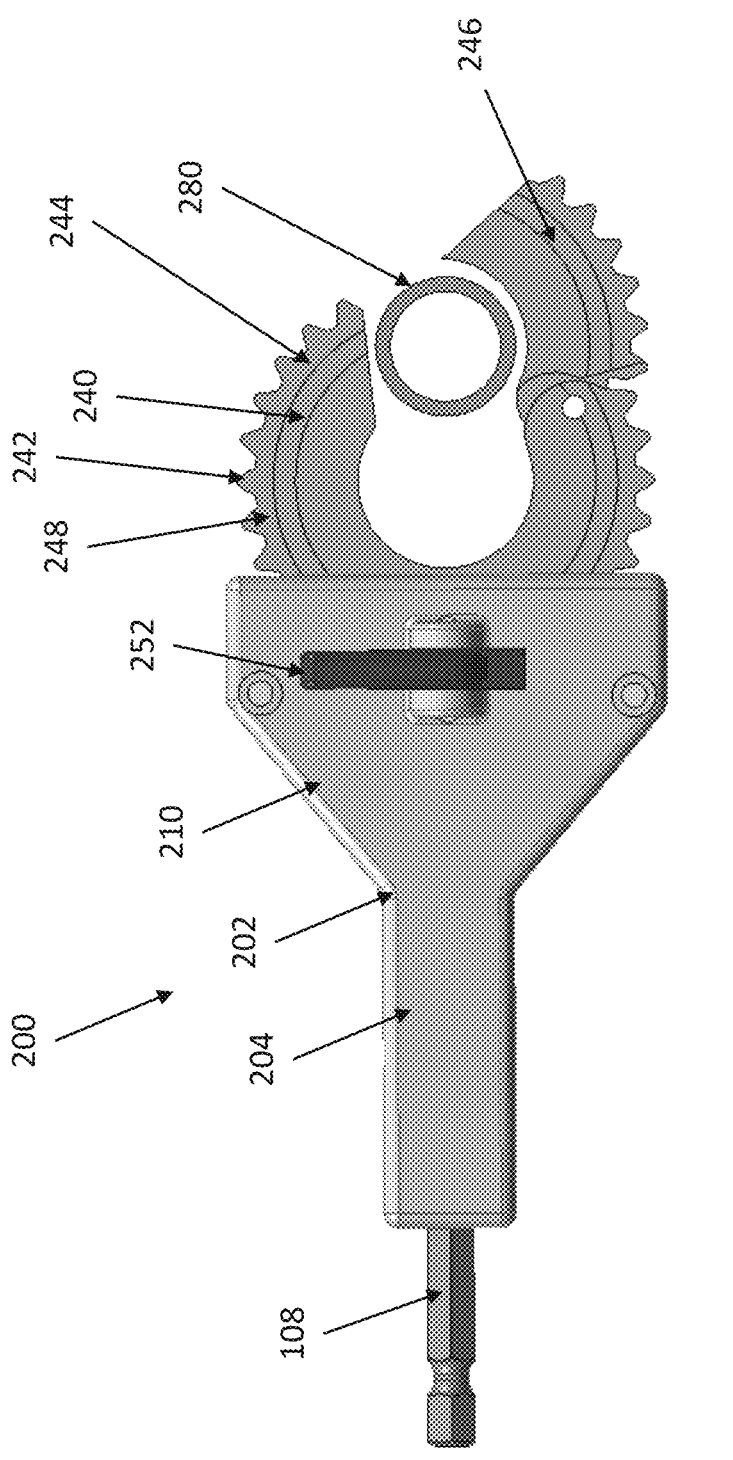
FIGS. 9-10 are top views of another embodiment of a power tool accessory for cutting a tubular member.
Figure 10:
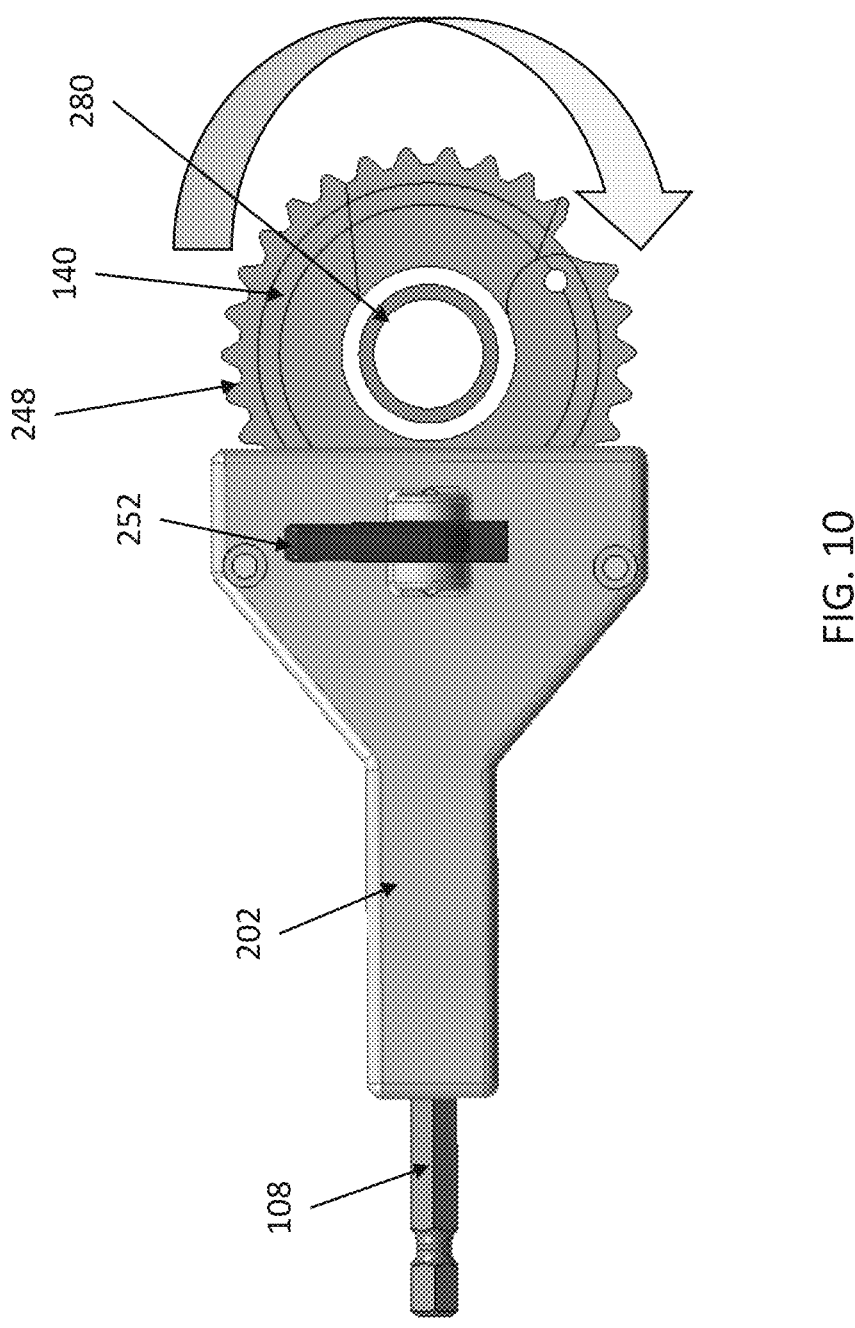
Figure 11:
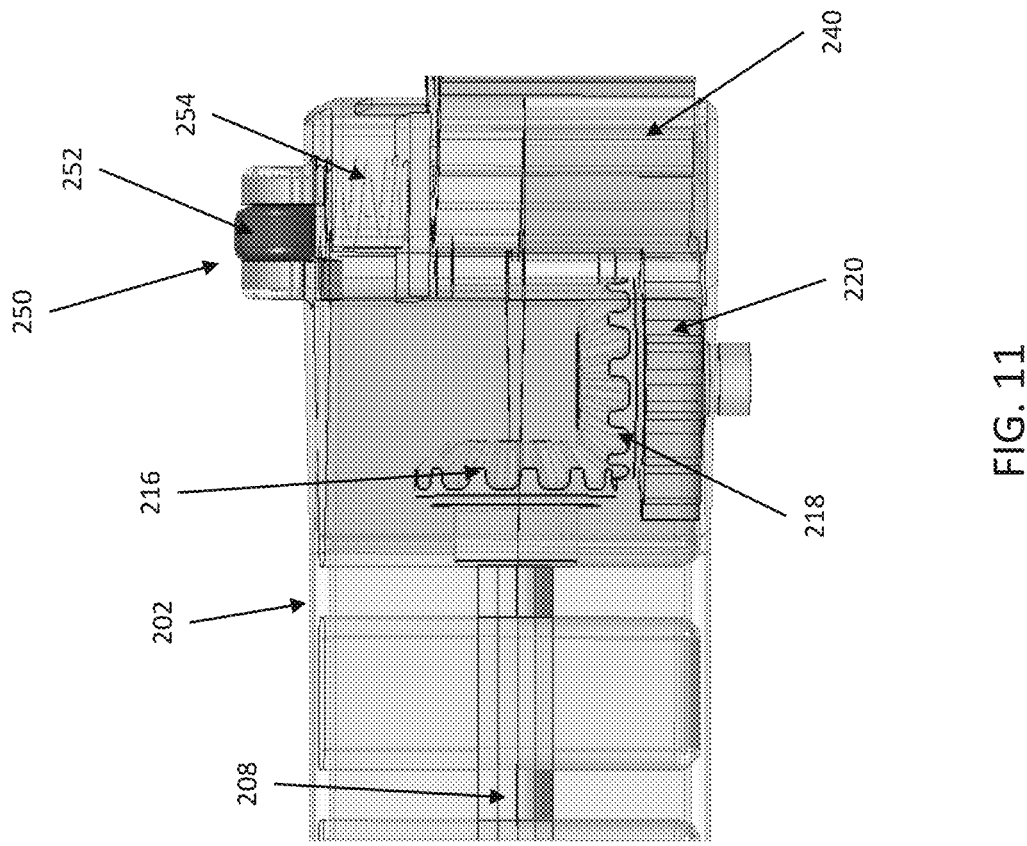
FIG. 11 is a side view, partially in phantom, of the power tool accessory of FIGS. 9-10.
Figure 12:
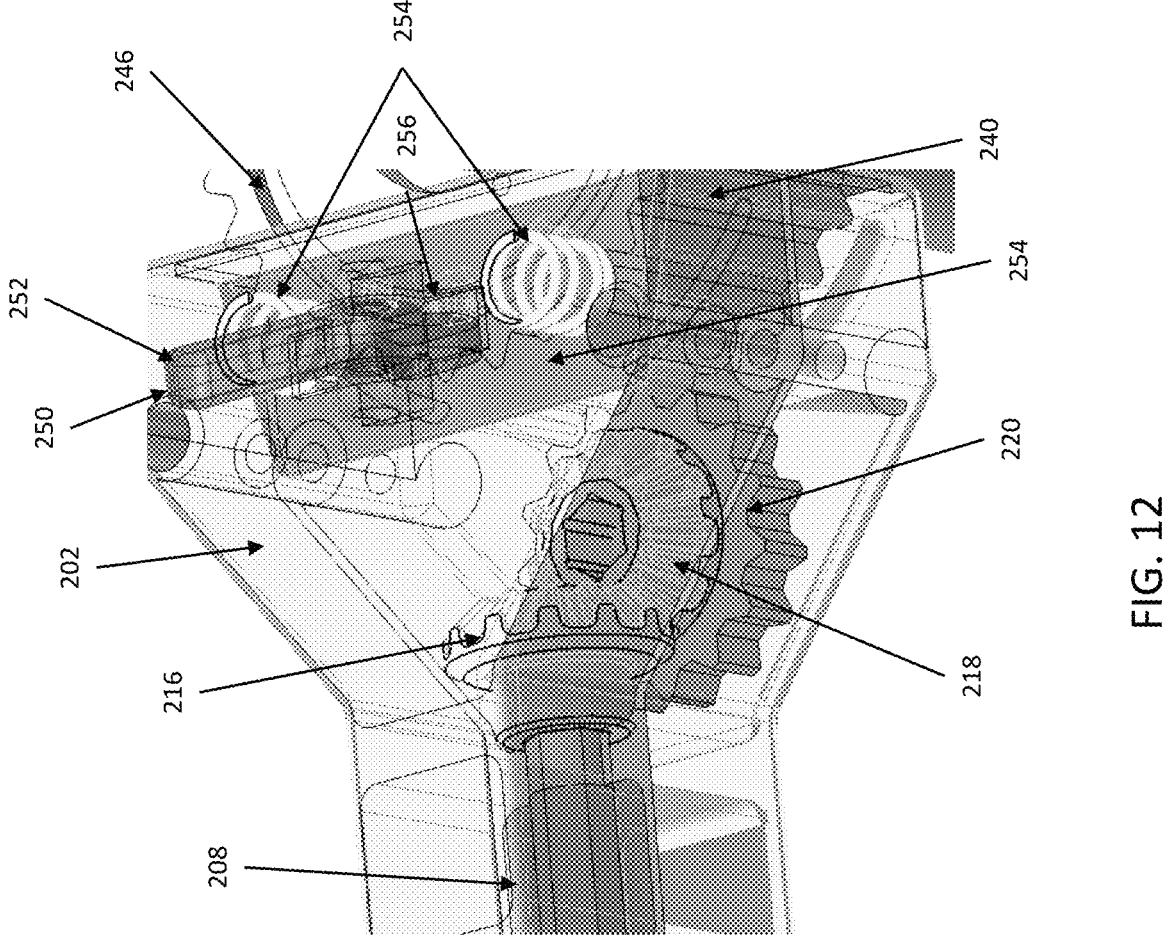
FIG. 12 is a perspective view, partially in phantom, of the power tool accessory of FIGS. 9-10.
Figure 13:
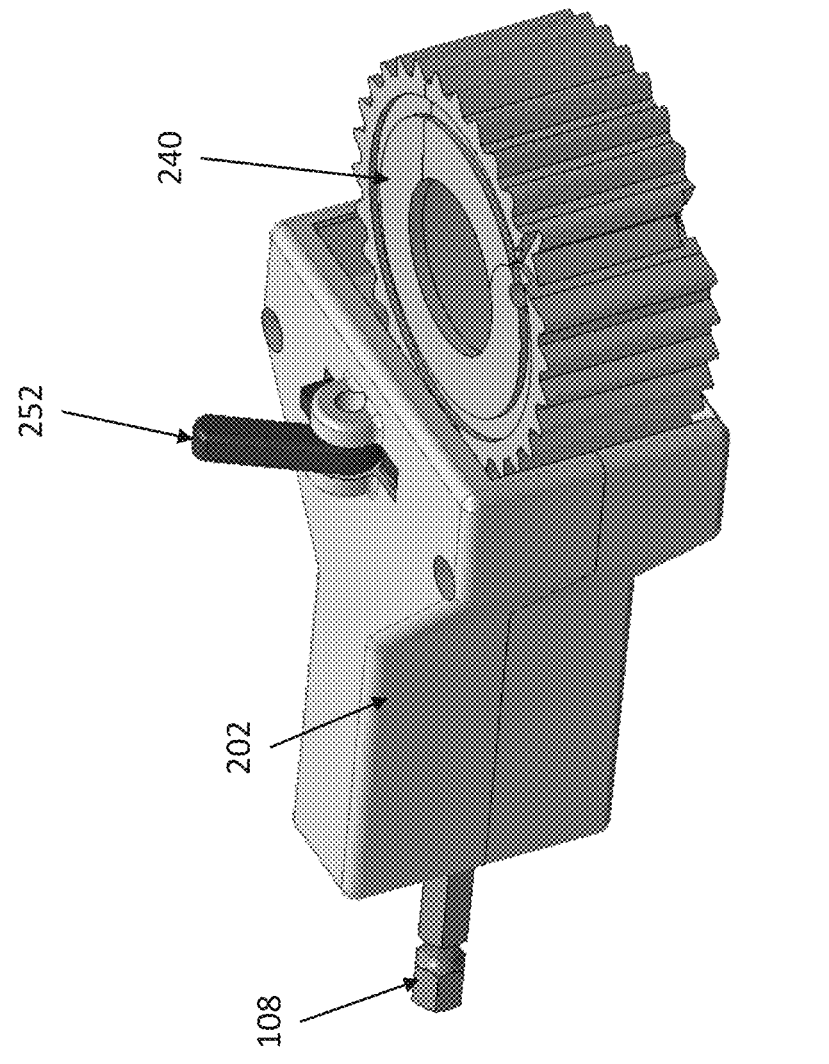
FIGS. 13-14 are perspective views of the power tool accessory of FIGS. 9-10.
Figure 14:
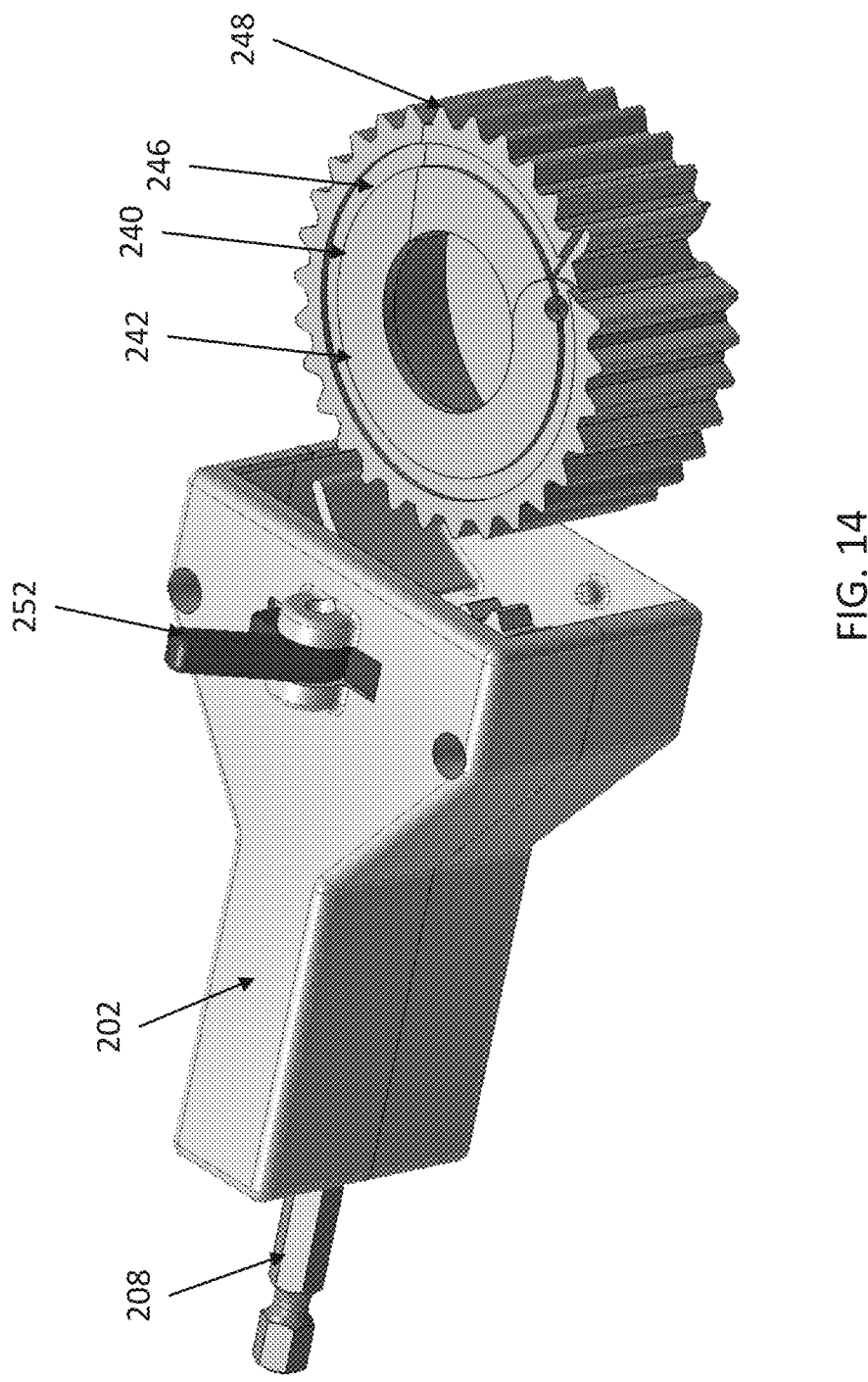
Figures 15, 16:
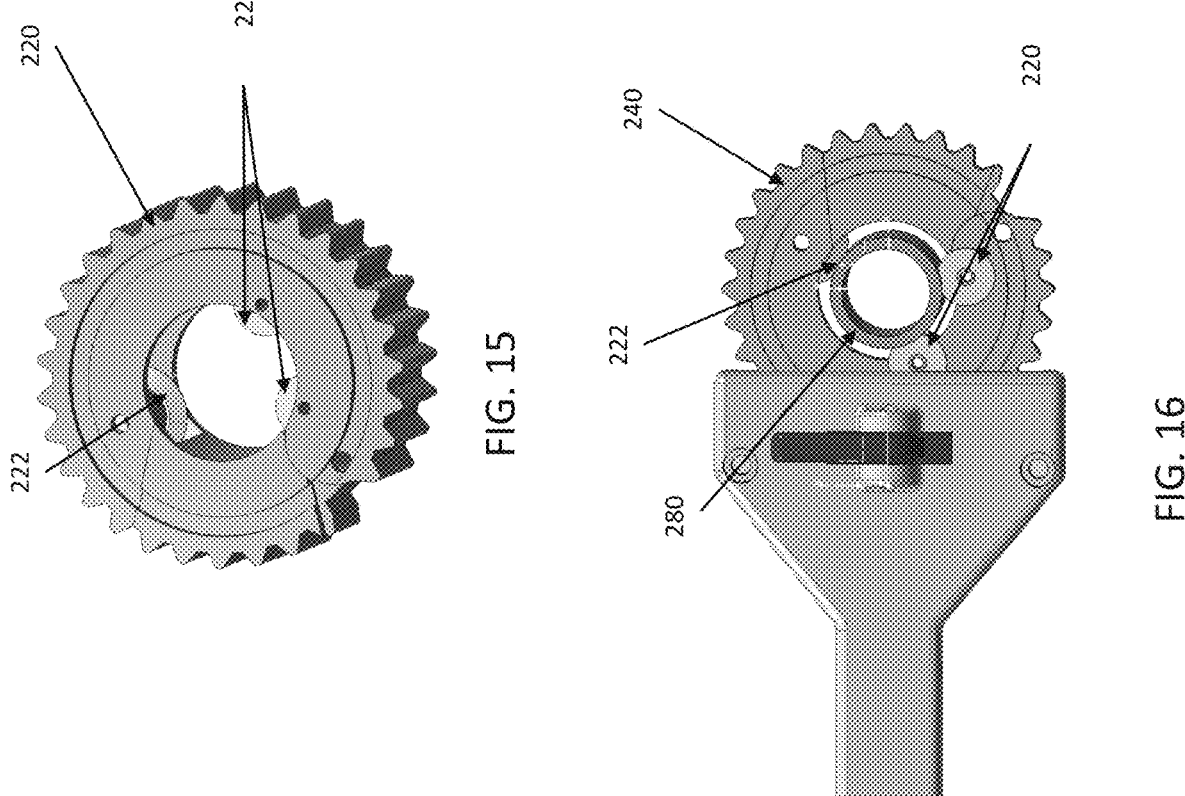
FIG. 15 is a perspective views of a cutting head for use with the power tool accessory of FIGS. 9-10.
FIG. 16 is a top view of the power tool accessory of FIGS. 9-10.
Figures 17A, 17B:
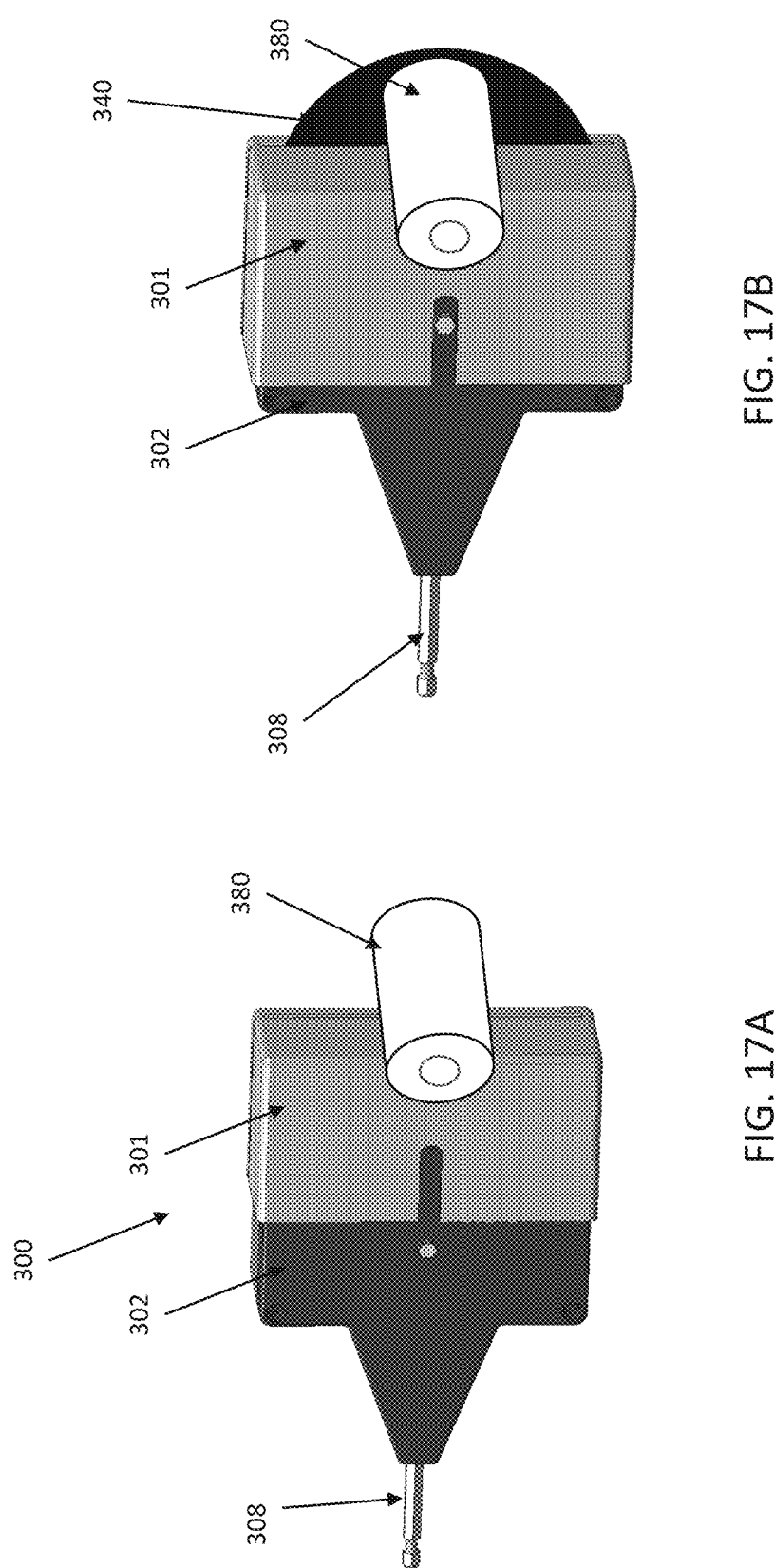
FIGS. 17A-17B are perspective views of another embodiment of a power tool accessory for cutting a tubular member.
Figure 18A:
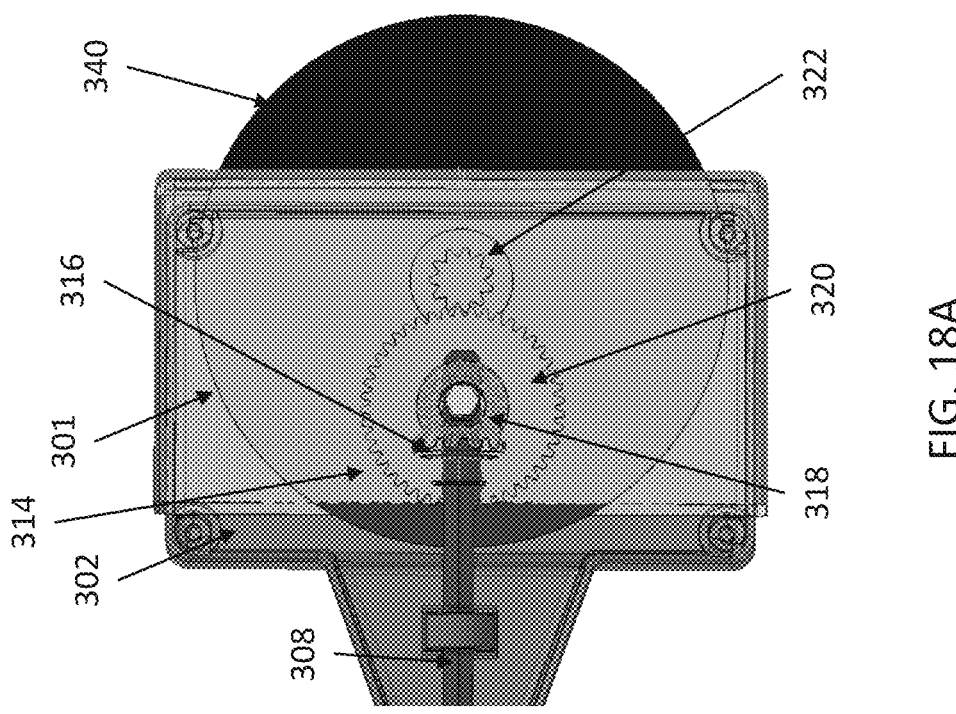
FIG. 18A is a top view, partially in phantom, of the power tool accessory of FIGS. 17A-17B.
Figure 18B:
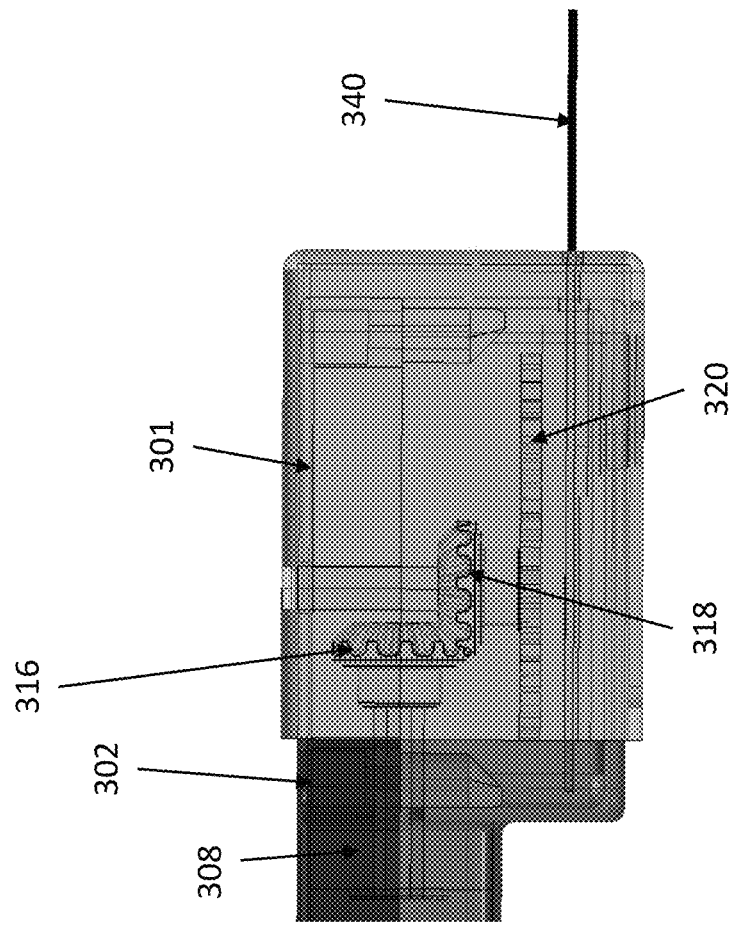
Figure 19:
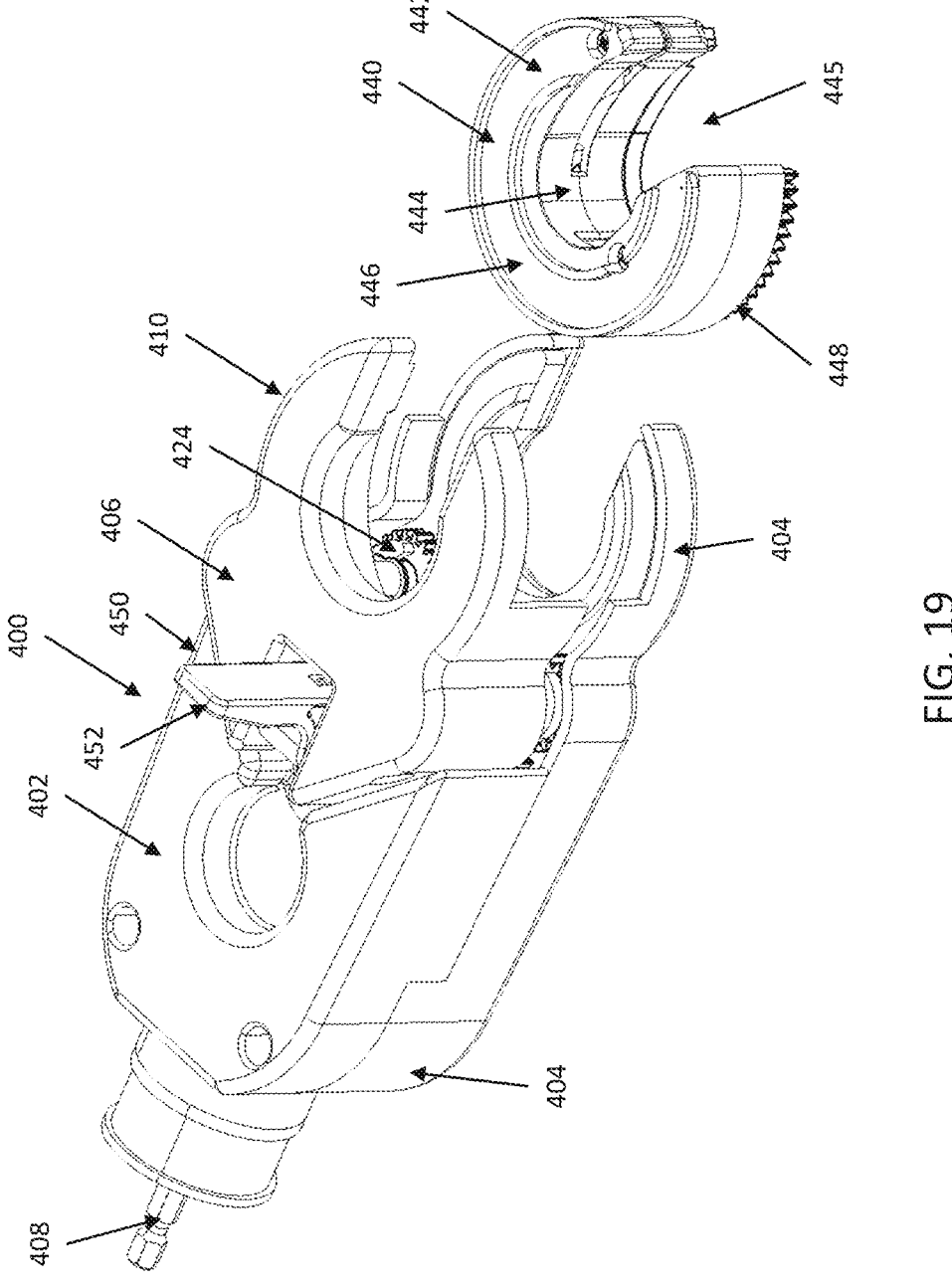
FIGS. 19-20 are perspective views of another embodiment of a power tool accessory for cutting a tubular member.
Figure 20:
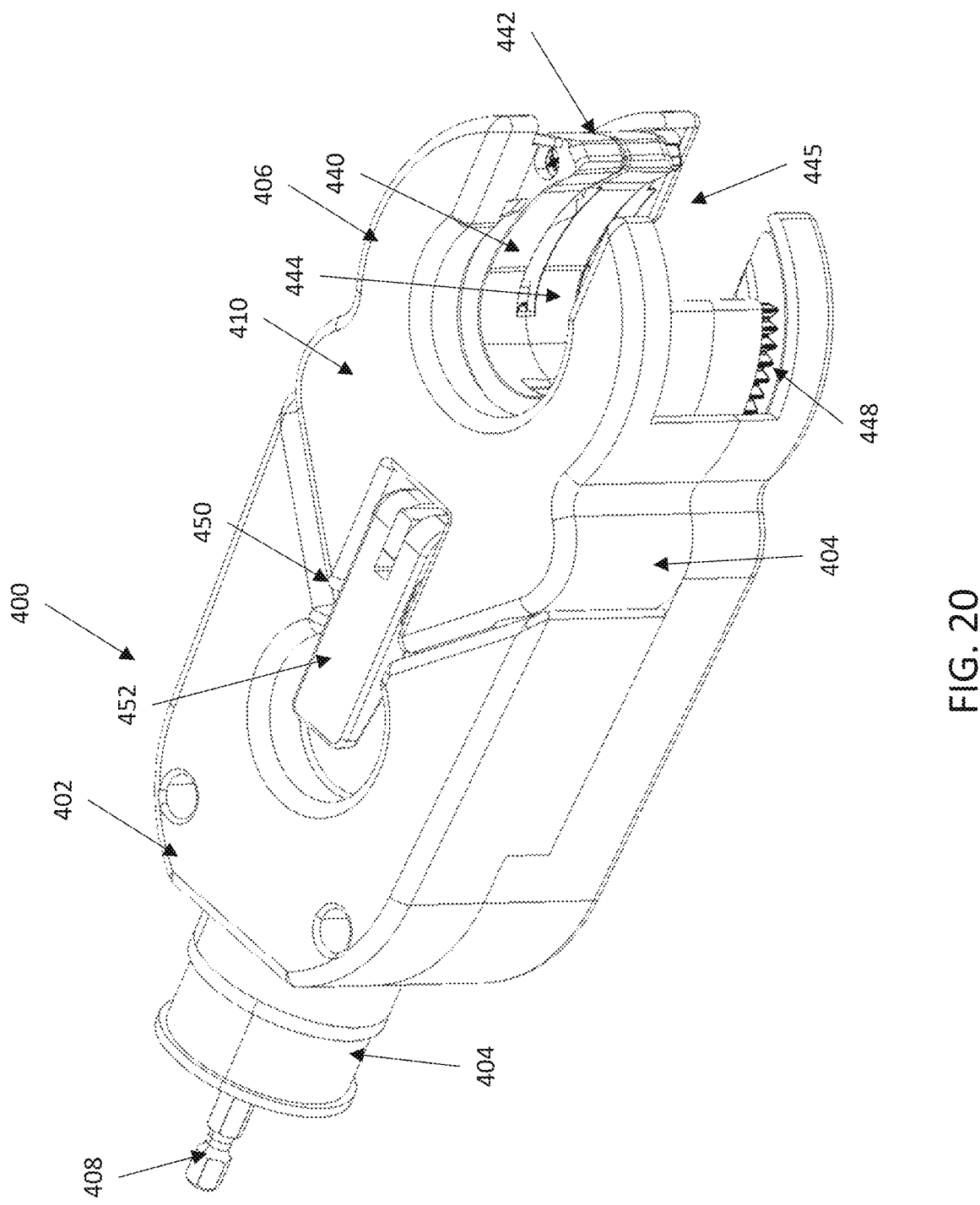
Figure 21:
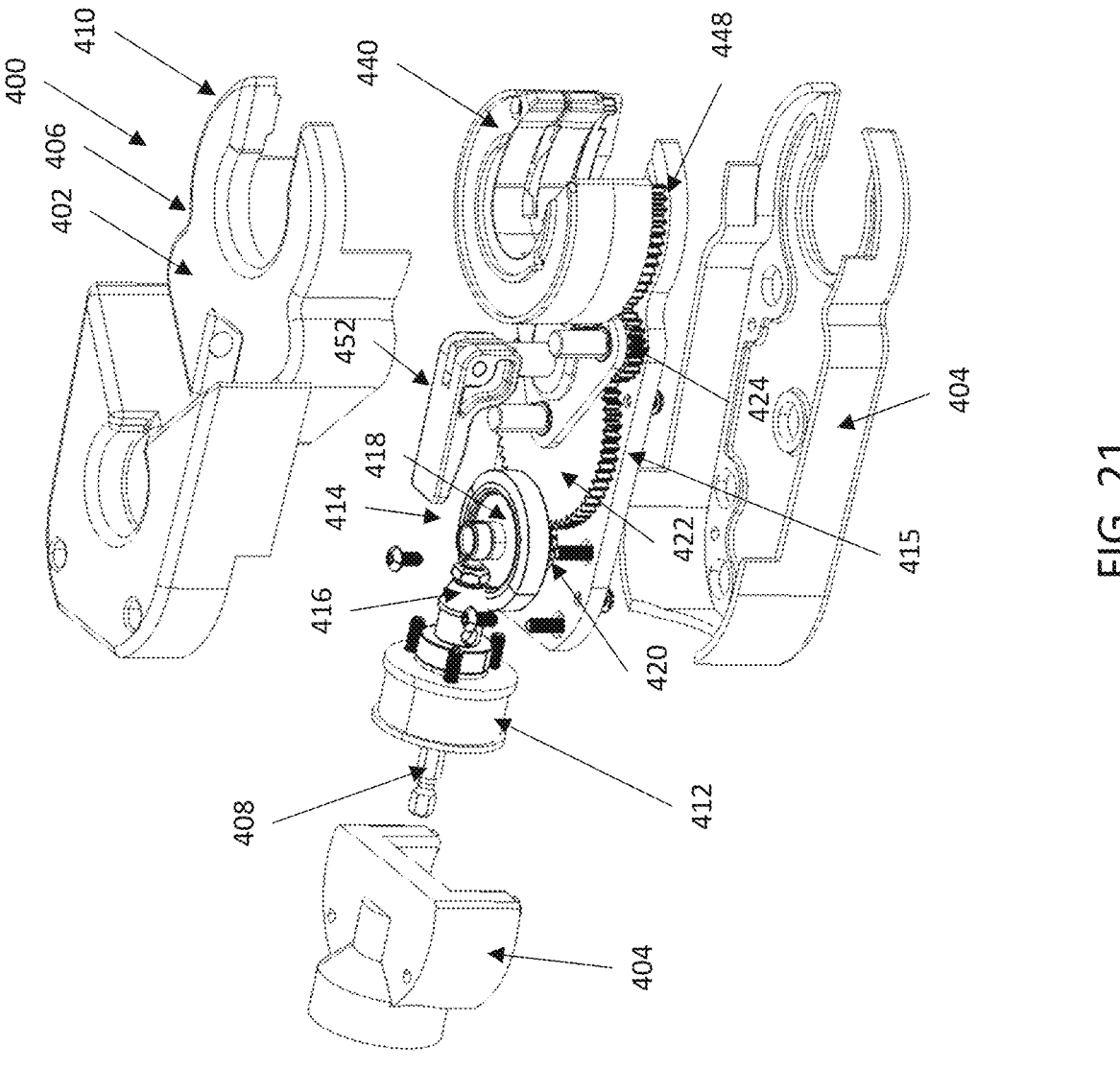
FIG. 21 is an exploded view of the power tool accessory of FIGS. 19-20.
Figure 22:
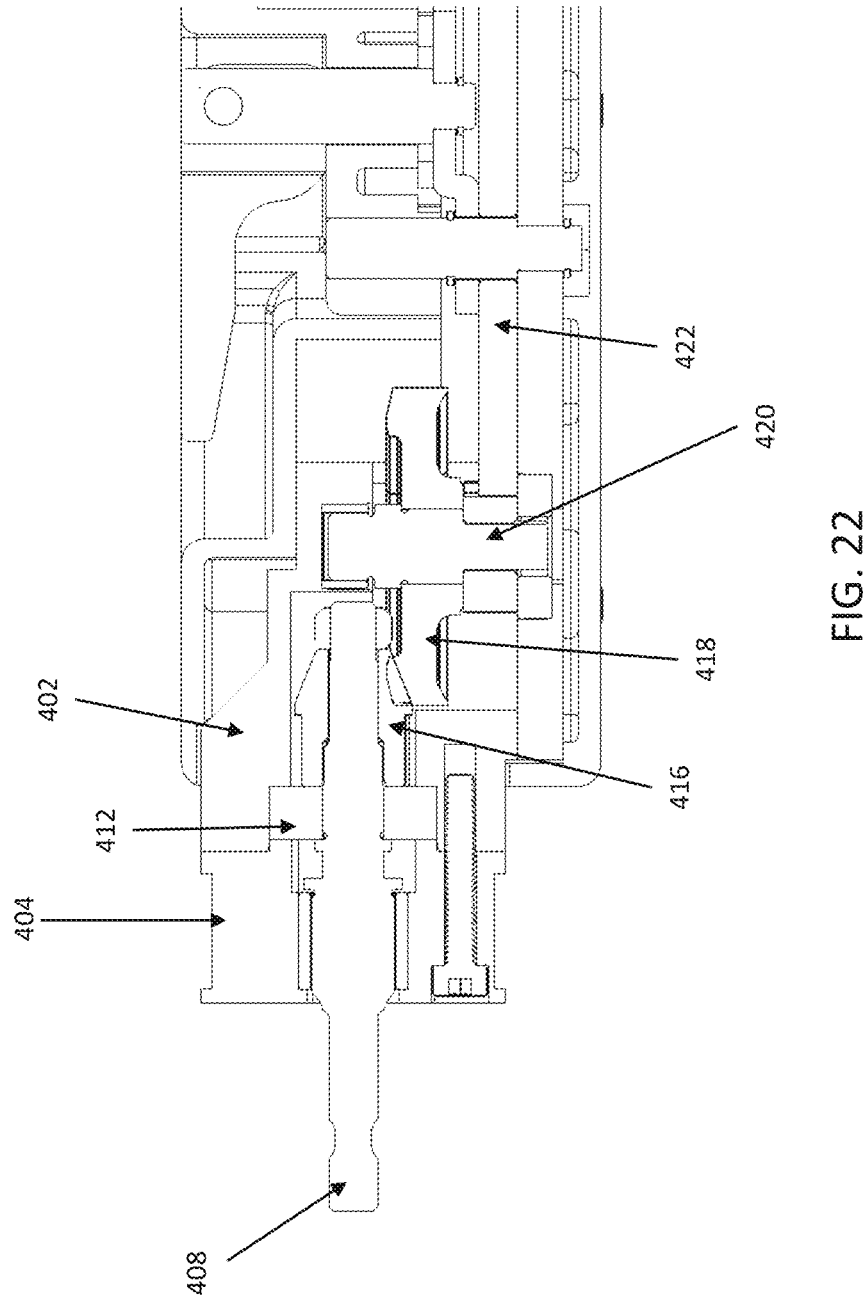
FIG. 22 is a side cross-sectional view of the power tool accessory of FIGS. 19-20.
Figure 23:
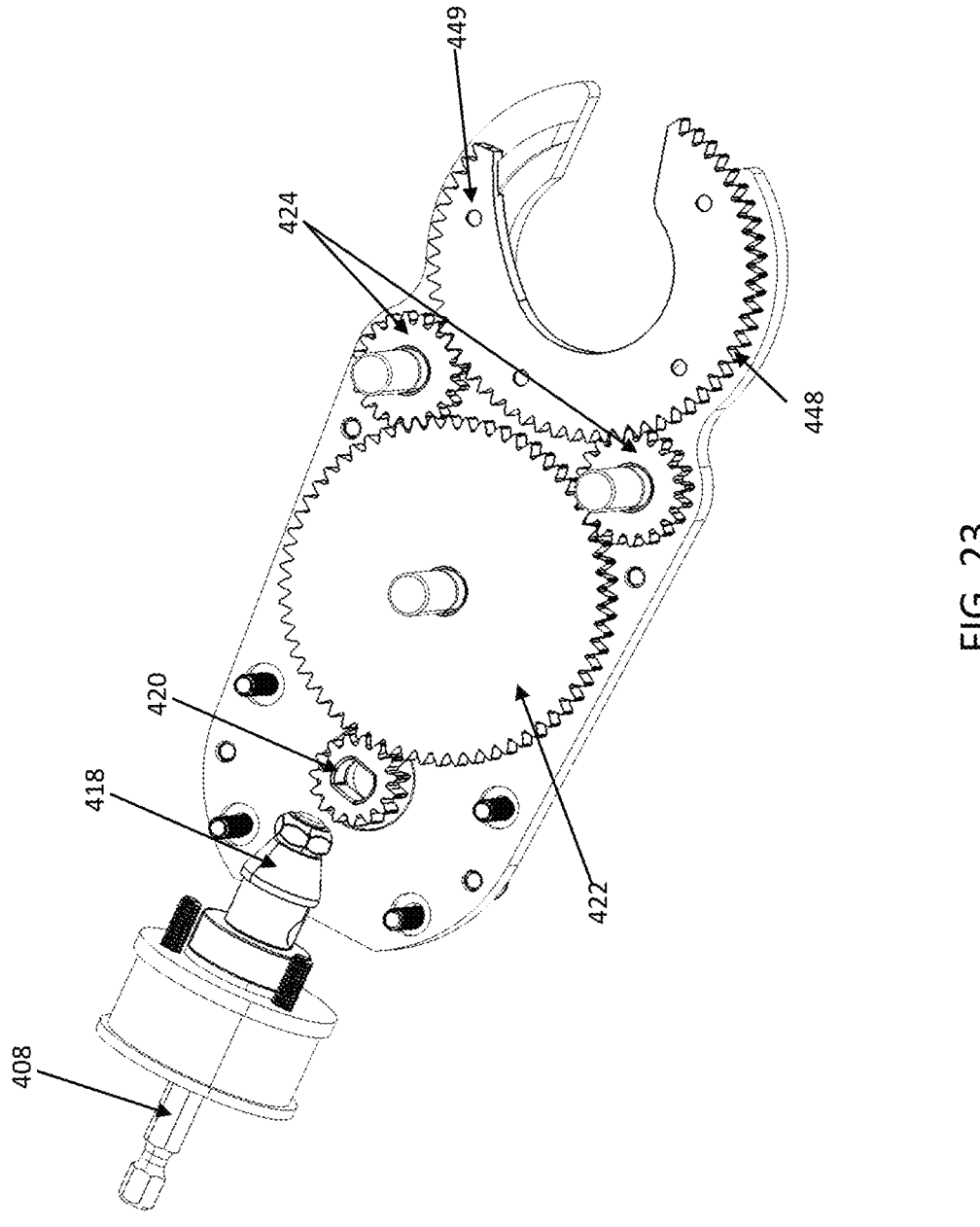
FIG. 23 is an internal perspective view of the transmission of the power tool accessory of FIGS. 19-20.
Figures 24A, 24B:
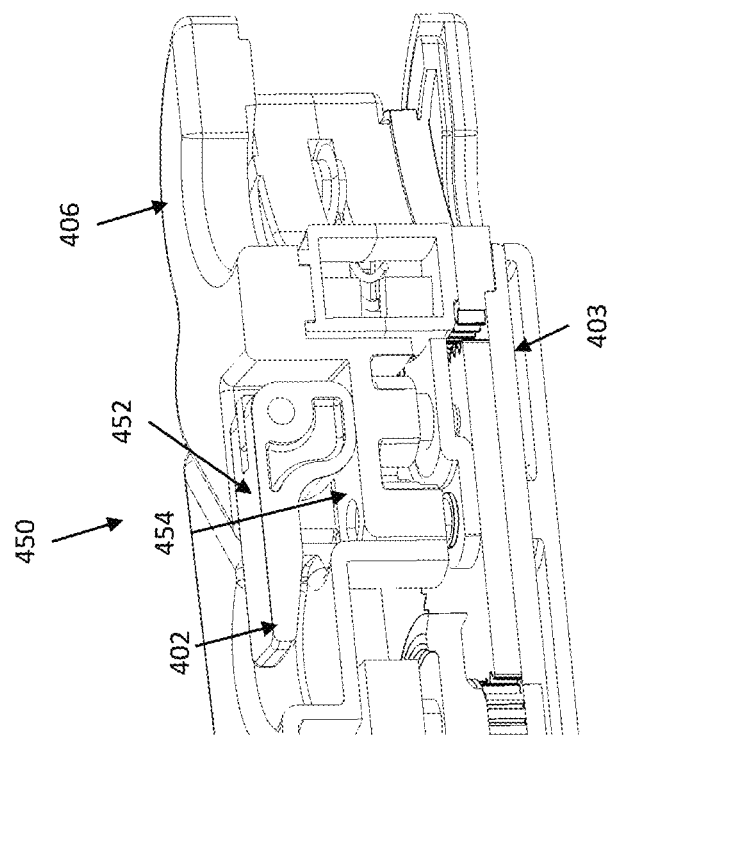
FIGS. 24A-24B are cross-sectional perspective views of the clamping mechanism of the power tool accessory of FIGS. 19-20.
Figure 25:
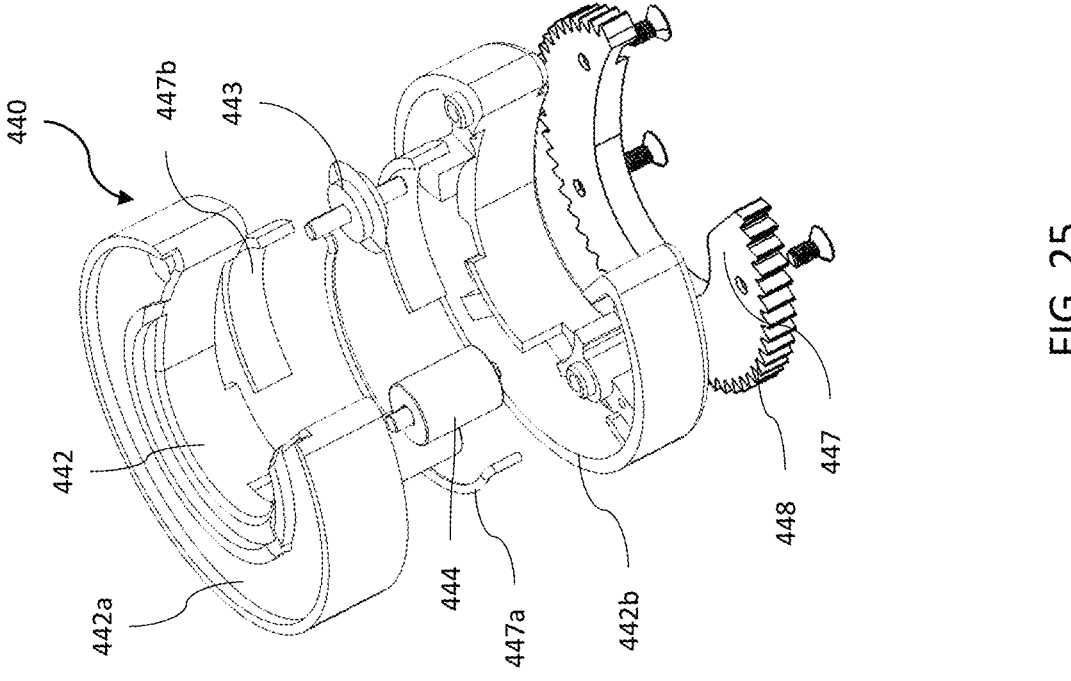
FIG. 25 is an exploded perspective view of the cutting head of the power tool accessory of FIGS. 19-20.
Figure 26:
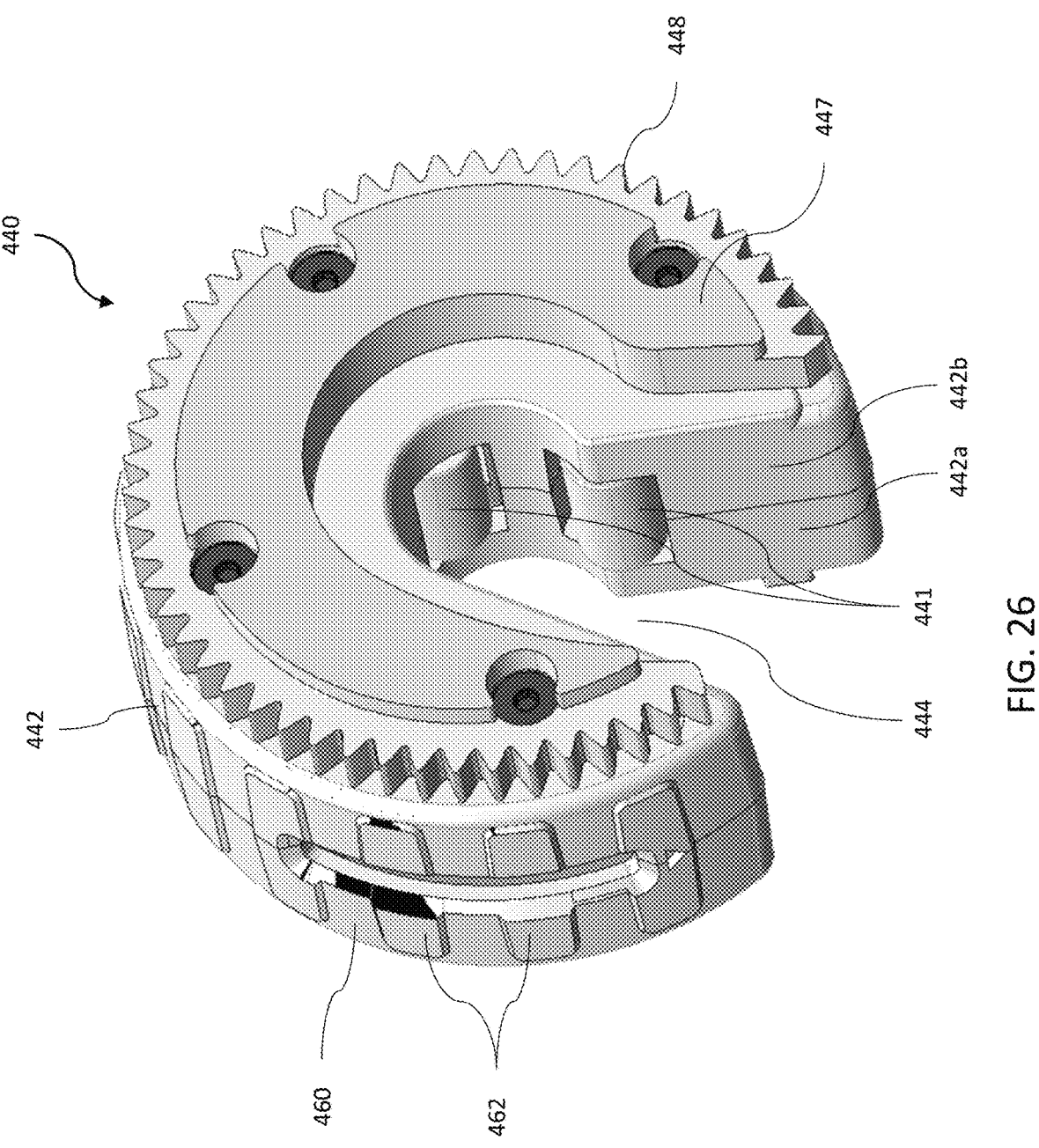
FIG. 26 is a bottom perspective view of the cutting head of the power tool accessory of FIGS. 19-20.

The cover 106 includes a clamping mechanism 150 that can be actuated to lift the cover 106 away from the housing 102 by unlocking the cam locking mechanism 150 with a cam lock lever 152. Referring to FIGS. 4A-4B, the cam lock lever 152 is coupled to a cam lock 154 that enables the cover to be lifted. This allows the cutting head to be removed and changed, enabling cutting heads having different interior sizes to be coupled to the working head for cutting tubular members of different diameters. The cutting head can also be ratcheted or rotated by hand to cut a pipe when it is removed from the housing. Alternatively, the cutting head may be removed from the housing and used by itself has a manual hand tool, similar to the hand tool shown in FIGS. 1A-1D and/or may be attached to a hand tool housing similar to the hand tool housing shown in FIGS. 1E-1F.

Referring to FIGS. 9-16, in another embodiment, a power tool accessory 200 for cutting tubular members, such as pipes, includes a housing 202 having a handle 204 and a working head portion 210. The housing 202 receives an input shaft 208 that can be coupled to and driven in rotation by a drill, impact driver, or other rotary power tool. The input shaft 208 is supported by a bearing 212 in the handle 204 and is drivingly coupled to a transmission 214. The transmission 214 includes an input right angle gear 216, which drives an intermediate right angle gear 218. The intermediate right angle gear 218 is mounted on a common shaft with an output gear 220.

The working head portion 210 removably receives a cutting member or cutting head 240 having a similar configuration as the C-shaped cutting heads 10, 40, 140 described above, with the following differences. The cutting head 240 has a circumferential casing 242 with a pivoting door 246 and a central opening 244. The door 246 that can pivot open to receive a pipe in the central opening 244. At least one roller 220 and at least one cutting wheel or blade 222 that each at least partially extend radially inward into the central opening 244 and are biased in a radially inward direction by leaf springs. The casing 242 also has a circumferential track 246 on one or both of the top surface and the bottom surface and a plurality of gear teeth 248 formed on an outer periphery of the casing 242. The cutting head is receivable in the working head portion 210 of the housing 202 so that the gear teeth 248 on the cutting head 240 mesh with the teeth on the output gear 220 of the transmission. Thus, rotation of the input shaft 208 causes rotation of the cutting head about its center axis.

The cutting head is removably held in place in the body by a clamping mechanism 250 similar to the clamping mechanism 150 described above. The clamping mechanism includes a camming latch 252 that presses downward against a plate 254 that carries one or more pins 256 that engages the track 246 in the cutting head 240. A pair of springs 254 push the plate away from the cutting head unless the latch 252 is in its locked position, pressing the plate toward the cutting head. When the latch is closed, the one or more pins 256 are pressed into the track 246 on the cutting head 240 and ride in the track so that the cutting head is retained in the housing as the cutting head rotates.

In use, a tubular member or pipe 280 is received in the central opening by opening and closing the door on the cutting head. The input shaft is coupled to a rotary power tool. As the rotary power tool causes the input shaft to rotate, the cutting head rotates and the cutting wheel or blade cuts into the pipe. Alternatively, the cutting head may be removed from the housing and used by itself has a manual hand tool, similar to the hand tool shown in FIGS. 1A-1D and/or may be attached to a hand tool housing similar to the hand tool housing shown in FIGS. 1E-1F.

Referring to FIGS. 17A-18B, in another embodiment, a power tool accessory 300 for cutting tubular members 380, such as pipes, includes an input shaft 308 that can be coupled to and driven in rotation by a drill, impact driver, or other rotary power tool. The input shaft 308 is received in a rear end of base or housing 302 and a retractable sheath 301 received over the base and biased by a spring (not shown) away from the input shaft. The input shaft 308 is coupled to a transmission 314 that includes pair of right angle gears (an input right angle gear 316 and an output right angle gear 318). The output right angle gear 318 is mounted on a common shaft with a large spur gear 320, which meshes with a small spur gear 322 to facilitate a speed reduction. The small spur gear 322 is coupled to an output shaft to which a removable cutting wheel or blade 340 is mounted, e.g., in a manner similar to a circular saw or an angle grinder. The transmission is configured to increase rotational speed from the input shaft to the cutting wheel or blade. The cutting wheel or blade 340 may comprise an abrasive wheel, such as an abrasive cutting wheel or blade used with angle grinders. In use, the input shaft is coupled to an impact driver and then the sheath is pressed against a pipe and retracts, while the cutting wheel or blade is used to cut the pipe. The sheath may include a recess in its front end to better retain or locate the pipe relative to the sheath and the cutting wheel or blade.

Referring to FIGS. 19-26, in another embodiment, a power tool accessory 400 for cutting tubular members, such as pipes, includes a housing 402 having a stationary bottom portion 403 and a moveable cover 406. Together, the housing defines a handle 404 and a U-shaped working head portion 410. The housing 402 receives an input shaft 408 that can be coupled to and driven in rotation by a drill, impact driver, or other rotary power tool. The input shaft 408 is supported by a bearing 412 in the handle 404 and is drivingly coupled to a transmission 414. The transmission 414 includes an input right angle gear 416, which drives an output right angle gear 418. The output right angle gear 418 is mounted on a common shaft with a first spur gear 420 having a small diameter and number of teeth. The first spur gear 420 meshes with a second spur gear 422 having a larger diameter and number of teeth to facilitate a speed reduction. The second spur gear 422 meshes with at least two smaller idler gears 424 that are separated from one another by a distance greater than width of a front opening in the C-shaped cutting head or puck, as described below. The components of the transmission 414 are supported on a support plate 415 that is received in the bottom portion or base 404 of the housing 402.

The working head portion 410 removably receives a C-shaped cutting head or puck 440 having a similar configuration as the C-shaped cutting heads 10, 40, 140 described above, with the following differences. The cutting head 440 has a C-shaped casing 442 with a central opening 444 and a front opening 445 having a width less than a distance between the idler gears 424. The casing 442 has a two casing halves 442a, 442b carrying at least one roller 441 and at least one cutting wheel or blade 443 that each at least partially extend radially inward into the central opening 444 and are biased in a radially inward direction by one or more leaf springs 447a, 447b. The C-shaped casing 442 also has a circumferential track 446 on a top surface and a gear teeth 448 on an opposite bottom surface. The gear teeth 448 may be formed on a separate gear plate 449 that is affixed to the casing 442 or may be integral with the casing 442. The cutting head is removably receivable in the working head portion 410 of the housing 402 so that the gear teeth 448 on the cutting head 440 mesh with the teeth on the idler gears 424 of the transmission. Rotation of the input shaft 408 causes rotation of the cutting head 440 about its center axis. Because the at least two idler gears 424 are separated by a distance greater than a width of the front opening, at least one of the idler gears 424 will always remain in mesh with the teeth 448 on the cutting head 440 during an entire 360 degree rotation about its axis. This will ensure that the cutting head continues to rotate smoothly regardless of its angular position.

The cutting head 440 is removably held in place in the body by a clamping mechanism 450 similar to the clamping mechanism 150 described above. The clamping mechanism includes a camming latch or lever 452 that presses downward against a top surface 454 of the cover 406. The cover also carries one or more pins (not shown) that engage the track 446 in the cutting head 440. One or more springs may bias the cover 406 away from the cutting head unless the latch 452 is in its locked position, pressing the plate toward the cutting head. When the latch is closed, the one or more pins are pressed into the track 446 on the cutting head 440 and ride in the track so that the cutting head stays in the housing. The cutting head 440 also includes a grip surface 460 (e.g., with a plurality of raised lozenges 462) on its outer periphery that allows the cutting head to be used as a manual hand tool, in a similar manner to the cutting head shown in FIGS. 1A-1D, when the cutting head is removed from the housing.

In use, a tubular member or pipe is received through the front opening into the central opening of the cutting head. The input shaft is coupled to a rotary power tool. As the rotary power tool causes the input shaft to rotate, the cutting head rotates and the cutting wheel or blade cuts into the pipe. Alternatively, the cutting head may be removed from the housing and used by itself has a manual hand tool, similar to the hand tool shown in FIGS. 1A-1D and/or may be attached to a hand tool housing similar to the hand tool housing shown in FIGS. 1E-1F.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. A power tool accessory for cutting tubular members comprising:

a housing;

an input shaft at least partially received in a rear end portion of the housing, the input shaft configured to be coupled to a rotary power tool to be driven in rotation by the power tool;

a transmission received in the housing, the transmission including an input gear drivingly coupled to the input shaft and at least one output member with a first plurality of teeth;

a cutting head removably and rotatably coupleable to a front end portion of the housing, the cutting head having a generally U-shaped central opening, at least one cutting blade that protrudes into the central opening, and a second plurality of teeth configured to be drivingly engaged by the first plurality of teeth; and a clamp assembly coupled to the housing and moveable between a first position in which the cutting head is removable from the housing and a second position in which the cutting head is retained in the housing, the clamp assembly having a generally U-shaped clamp assembly opening, wherein the cutting head is configured to receive a tubular member in the central opening with the cutting blade engaging the tubular member so that the cutting blade cuts the tubular member as the cutting head rotates about the tubular member in response to rotation of the input shaft, and wherein the clamp assembly is configured to cover substantially an entirety of a top face of the cutting head and the at least one cutting blade when the generally U-shaped central opening of the cutting head is aligned with the generally U-shaped clamp assembly opening.

2. The power tool accessory of claim 1, wherein the at least one output member comprises two or more output gears rotating at the same speed, each output gear having the first plurality of teeth configured to mesh with the second plurality of teeth on the cutting head.

3. The power tool accessory of claim 2, wherein the cutting head comprises a C-shaped body that carries the second plurality of teeth and the output gears are separated by a distance so that the first plurality of teeth on at least one of the output gears is always meshed with the second plurality of teeth on the C-shaped body as the cutting head rotates a full rotation about its axis.

4. The power tool accessory of claim 3, wherein the at least two output gears are idler gears and the transmission further comprises at least one speed reduction gear between the input gear and the idler gears.

5. The power tool accessory of claim 1, wherein the cutting head comprises a C-shaped body with an interior wall defining the central opening.

6. The power tool accessory of claim 5, wherein the C-shaped body carries at least one roller and the cutting blade with a spring biasing the cutting blade into the central opening.

7. The power tool accessory if claim 6, wherein the cutting head includes a grip surface on its outer periphery so that the cutting head is configured to be used as a manual operated cutter of tubular members when the cutting head is removed from the housing.

8. The power tool accessory of claim 1, wherein the housing includes a base and a cover moveable relative to the base of the housing.

9. The power tool accessory of claim 8, wherein the clamp assembly further comprises a spring that biases the cover away from the base and a latch with a cam surface moveable between a first position in which the cam surface presses the cover toward the base against the bias of the spring to retain the cutting head in the housing and a second position in which the cam surface allows the cover to move away from the base to allow for insertion or removal of the cutting head from the housing.

10. The power tool accessory of claim 9, wherein the cutting head includes an annular track and at least one of the base and the cover includes a protrusion that rides in the track to keep the cutting head centered as it rotates.

11. The power tool accessory of claim 1, wherein the cutting head comprises a plurality of cutting heads each having a central opening with a different interior size to accommodate different sized tubular members, the cutting heads being interchangeably receivable in the housing.

12. The power tool accessory of claim 1, wherein the transmission configured to convert rotation of the input shaft to ratcheting motion of the cutting head, so that the cutting blade cuts the tubular member as the cutting head rotates about the tubular member with a ratcheting motion in response to rotation of the input shaft.

13. The power tool accessory of claim 12, wherein the transmission includes an eccentric member coupled to a front end of the input shaft and a wobble plate engaged by the eccentric member and moveable in an oscillating back and forth motion upon rotation of the eccentric member by rotation of the input shaft.

14. The power tool accessory of claim 13, wherein the wobble plate includes driving teeth engaged with driven teeth on a ratchet wheel received in a front end of the housing, and wherein oscillating motion of the wobble plate causes oscillating motion of the ratchet wheel.

15. The power tool accessory of claim 14, wherein the cutting head includes ratchet teeth and the ratchet wheel includes at least one ratchet pawl that engages ratchet teeth on the cutting head, such that when the ratchet wheel oscillates, the cutting head rotates in a ratcheting manner in one direction to cut the tubular member received in the cutting head.

16. The power tool accessory of claim 1, wherein the cutting head includes a C-shaped body and a pivoting door coupled to the C-shaped body and pivotable between an open position that allows a tubular member to be received in the central opening and a closed position that retains the tubular member in the central opening and forms an O-shaped cutting head with the C-shaped body,
   wherein the cutting head is configured to receive a tubular member in the central opening with the cutting blade engaging the tubular member so that the cutting blade cuts the tubular member as the cutting head rotates about the tubular member in response to rotation of the input shaft.

17. The power tool accessory of claim 16, wherein the C-shaped body and the pivoting door each include a second plurality of teeth configured to be drivingly engaged by the first plurality of teeth as the cutting head rotates a full rotation about its axis.

18. The power tool accessory of claim 1, wherein the input shaft is configured to rotate about a first axis and the cutting head is configured to rotate about a second axis that is transverse to the first axis.

19. A power tool accessory for cutting tubular members comprising:
   a housing including a generally U-shaped housing opening;
   an input shaft at least partially received in the housing, the input shaft configured to be coupled to a rotary power tool to be driven in rotation by the power tool;
   a transmission received in the housing and drivable by the input shaft, the transmission including an output member with a first plurality of teeth;
   a plurality of cutting heads interchangeably and rotatably coupleable to the housing, each cutting head including a generally U-shaped central opening with a different interior size, at least one cutting blade that protrudes into the central opening, and a second plurality of teeth configured to be drivingly engaged by the first plurality of teeth;
   wherein each cutting head is configured to receive a tubular member of different size in the central opening with the cutting blade engaging the tubular member so that the cutting blade cuts the tubular member as the cutting head rotates about the tubular member in response to rotation of the input shaft, and wherein each cutting head is receivable in the housing with the housing configured to cover substantially an entirety of a top face of each cutting head when each cutting head is received in the housing and each generally U-shaped central opening is aligned with the generally U-shaped housing opening.

20. A power tool accessory for cutting tubular members comprising:
   a housing;
   an input shaft at least partially received in a rear end portion of the housing, the input shaft configured to be coupled to a rotary power tool to be driven in rotation by the power tool;
   a transmission received in the housing, the transmission including an input gear rotatably drivable by the input shaft, at least one intermediate gear rotatably drivable by the input gear, and at least one output gear rotatably drivable by at least one of the at least one intermediate gear;
   a C-shaped cutting head removably and rotatably coupleable to a front end portion of the housing, the cutting head having a central opening and at least one cutting blade that protrudes into the central opening, the C-shaped cutting head configured to be rotatably drivable by the at least one output gear; and
   a cover coupled to the housing and moveable between a first position in which the cutting head is removable from the housing and a second position in which the cutting head is retained in the housing and is rotatable relative to the cover and the housing,
   wherein the cutting head is configured to receive a tubular member in the central opening with the cutting blade engaging the tubular member so that the cutting blade cuts the tubular member as the cutting head rotates about the tubular member in response to rotation of the input shaft,
   wherein the cutting head includes a grip surface on its outer periphery so that the cutting head is configured to be used as a manual operated cutter of tubular members when the cutting head is removed from the housing, and
   wherein the cutting head has a generally U-shaped central opening, the cover has a generally U-shaped cover opening, and the cover is configured to cover substantially an entirety of a top face of the cutting head when the generally U-shaped central opening of the cutting head is aligned with the generally U-shaped cover opening.

21. The power tool accessory of claim 1, wherein, in the second position, the cutting head is rotatable relative to the housing and the clamp assembly.

22. The power tool accessory of claim 1, wherein the housing includes a base to which the clamp assembly is coupled, the base having a generally U-shaped base opening aligned with the generally U-shaped clamp assembly opening, wherein the base is configured to cover substantially an entirety of a bottom face of the cutting head when the generally U-shaped central opening of the cutting head is aligned with the generally U-shaped base opening.

23. The power tool accessory of claim 19, wherein the housing includes a cover coupled to the housing and moveable between a first position in which each cutting head is removable from the housing and a second position in which each cutting head is retained in the housing and is rotatable relative to the cover and the housing.

* * * * *